(12) United States Patent
Kwon et al.

(10) Patent No.: US 9,123,119 B2
(45) Date of Patent: Sep. 1, 2015

(54) EXTRACTION OF OBJECTS FROM CT IMAGES BY SEQUENTIAL SEGMENTATION AND CARVING

(71) Applicant: TeleSecurity Sciences, Inc., Las Vegas, NV (US)

(72) Inventors: Junghyun Kwon, Las Vegas, NV (US); Jongkyu Lee, Las Vegas, NV (US); Samuel M. Song, Las Vegas, NV (US)

(73) Assignee: TeleSecurity Sciences, Inc., Las Vegas, NV (US)

( * ) Notice: Subject to any disclaimer, the term of this patent is extended or adjusted under 35 U.S.C. 154(b) by 115 days.

(21) Appl. No.: 13/708,912

(22) Filed: Dec. 7, 2012

(65) Prior Publication Data

US 2013/0170723 A1    Jul. 4, 2013

Related U.S. Application Data

(60) Provisional application No. 61/567,977, filed on Dec. 7, 2011.

(51) Int. Cl.
*G06T 7/00* (2006.01)

(52) U.S. Cl.
CPC ............ *G06T 7/0079* (2013.01); *G06T 7/0081* (2013.01); *G06T 7/0091* (2013.01); *G06T 2200/04* (2013.01); *G06T 2207/20028* (2013.01); *G06T 2207/20036* (2013.01); *G06T 2207/30112* (2013.01)

(58) Field of Classification Search
None
See application file for complete search history.

(56) References Cited

U.S. PATENT DOCUMENTS

| | | | | |
|---|---|---|---|---|
| 5,796,802 | A  * |  8/1998 | Gordon | 378/8 |
| 5,974,111 | A  * | 10/1999 | Krug et al. | 378/57 |
| 6,088,423 | A  * |  7/2000 | Krug et al. | 378/57 |
| 6,317,509 | B1 * | 11/2001 | Simanovsky et al. | 382/131 |
| 7,813,540 | B1 * | 10/2010 | Kraft | 382/143 |
| 8,233,586 | B1 * |  7/2012 | Boas | 378/4 |
| 8,320,659 | B2 * | 11/2012 | Song et al. | 382/143 |
| 8,577,115 | B2 * | 11/2013 | Gering et al. | 382/132 |
| 8,600,149 | B2 * | 12/2013 | Song et al. | 382/143 |
| 2005/0276443 | A1 * | 12/2005 | Slamani et al. | 382/103 |
| 2006/0274916 | A1 * | 12/2006 | Chan et al. | 382/100 |
| 2009/0034790 | A1 * |  2/2009 | Song et al. | 382/103 |
| 2009/0226060 | A1 * |  9/2009 | Gering et al. | 382/128 |
| 2010/0046704 | A1 * |  2/2010 | Song et al. | 378/57 |
| 2010/0239182 | A1 * |  9/2010 | Basu | 382/282 |
| 2012/0045127 | A1 * |  2/2012 | Song et al. | 382/171 |
| 2012/0069963 | A1 * |  3/2012 | Song et al. | 378/87 |
| 2012/0229631 | A1 * |  9/2012 | Song et al. | 348/143 |

* cited by examiner

*Primary Examiner* — Tsung-Yin Tsai
(74) *Attorney, Agent, or Firm* — Procopio, Cory, Hargreaves & Savitch, LLP

(57) ABSTRACT

Extracting objects from a computed tomography (CT) image, including: sequentially applying segmentation and carving on volumetric data of the objects in the CT image; and splitting and merging the segmented objects based on homogeneity of the objects in the CT image.

4 Claims, 37 Drawing Sheets

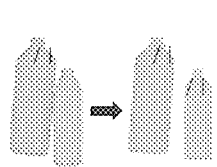 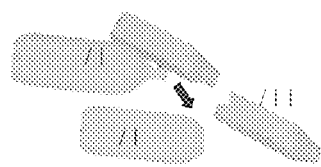 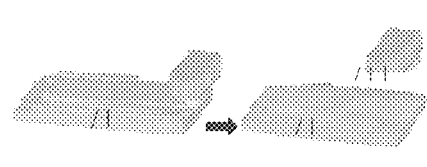
FIG. 7A     FIG. 7B     FIG. 7C
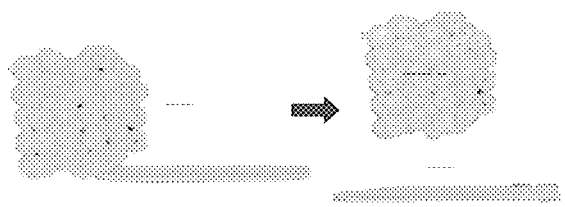 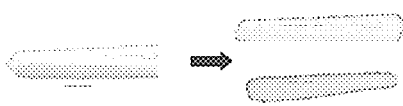
FIG. 8A     FIG. 8B
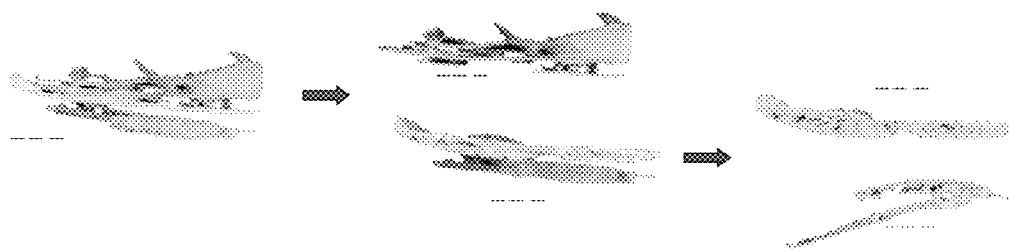
FIG. 8C

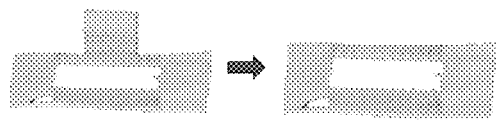 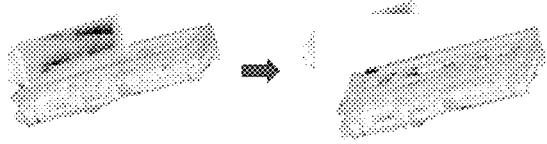
FIG. 9A            FIG. 9B
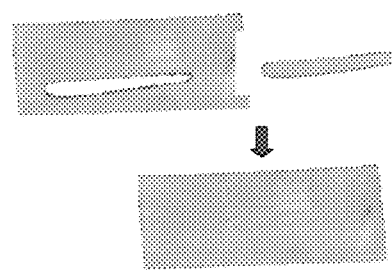 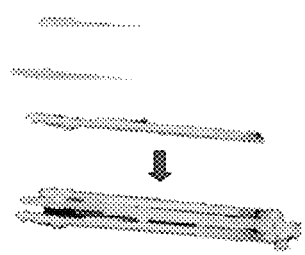 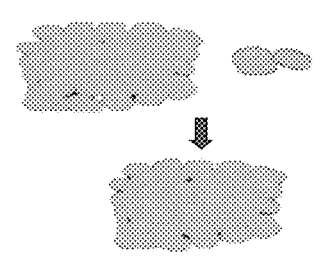
FIG. 10A       FIG. 10B       FIG. 10C

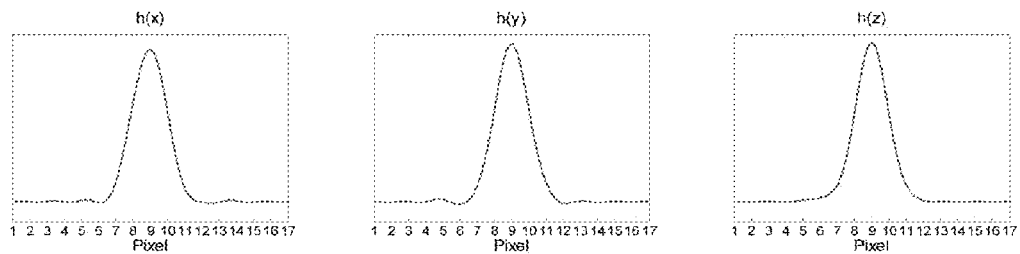
FIG. 13A    FIG. 13B    FIG. 13C
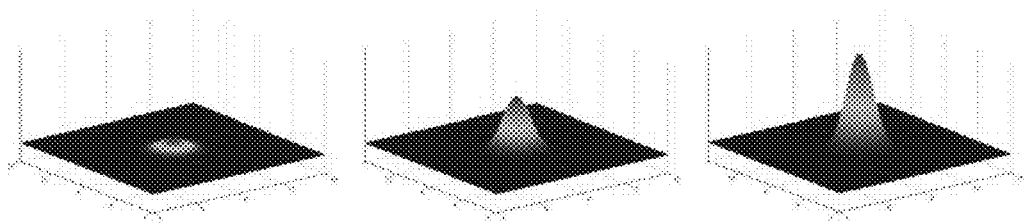
FIG. 14A    FIG. 14B    FIG. 14C
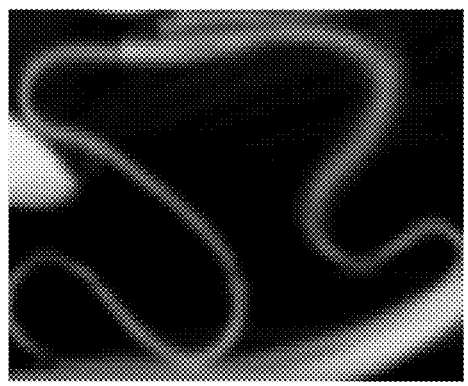 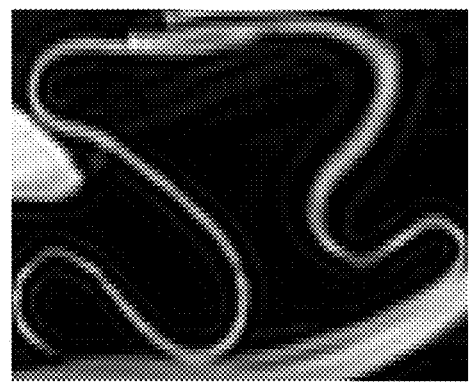
FIG. 15A    FIG. 15B

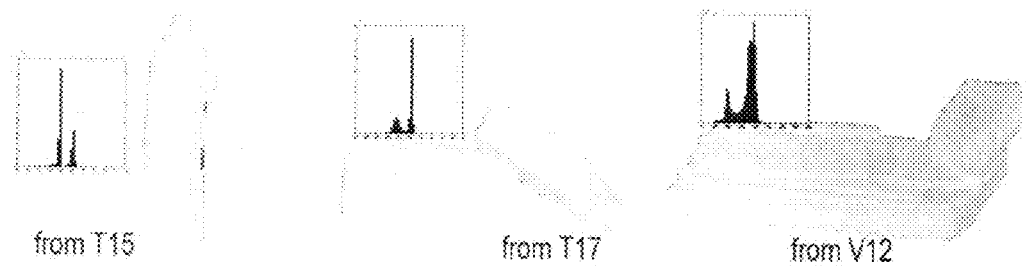
FIG. 16
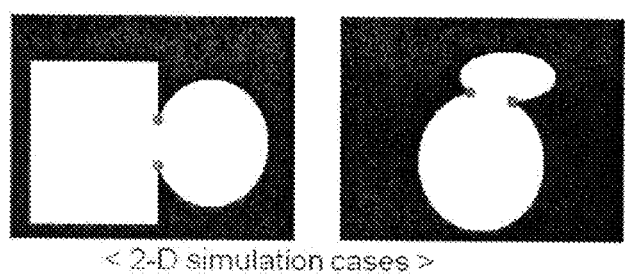
FIG. 17A
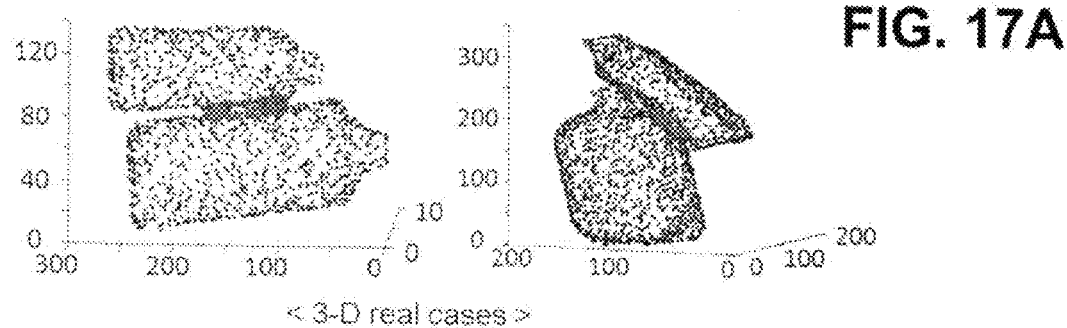
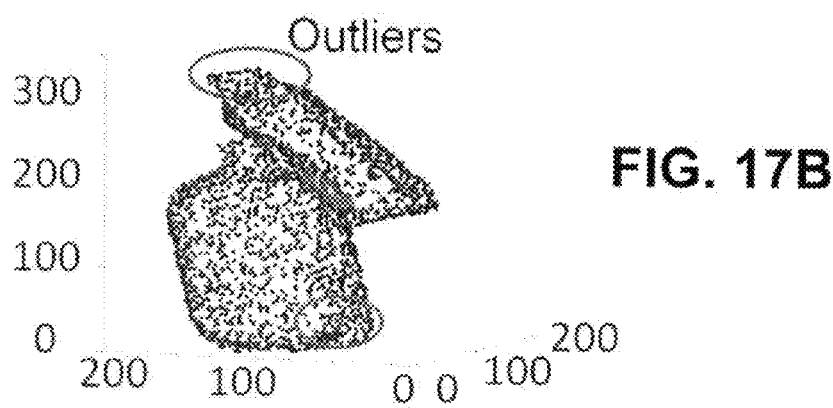
FIG. 17B

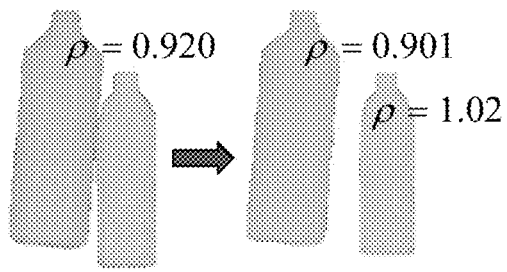
from T15 (70% Isopropyl Alcohol and Water)
FIG. 18A
FIG. 18B
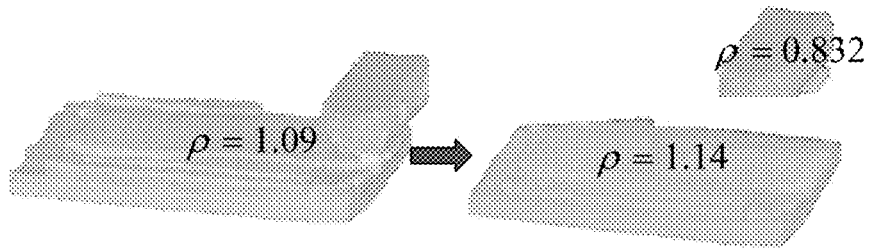
from V12 (Organic Stack and Aerosol Metallic Paint)
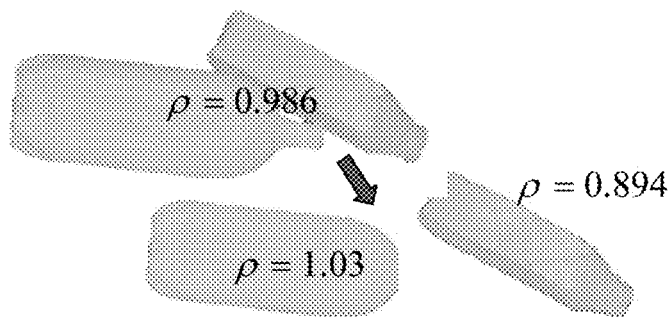
FIG. 18C
from T17 (Mountain Dew and Motor Oil)

from T3 from T3 from T3

FIG. 20A
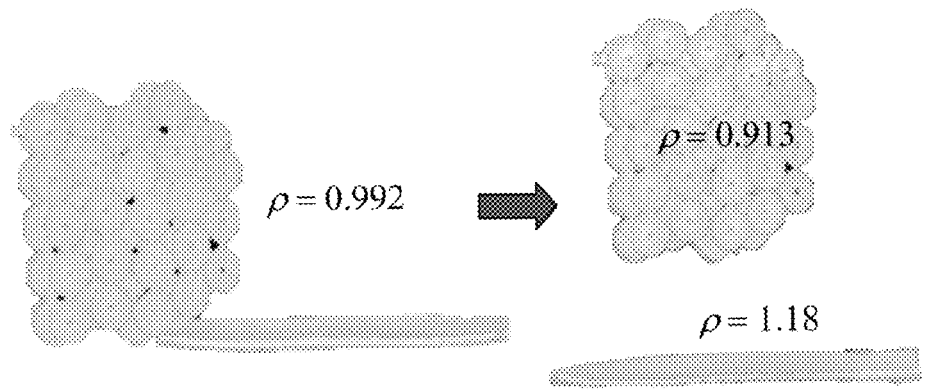
FIG. 20B
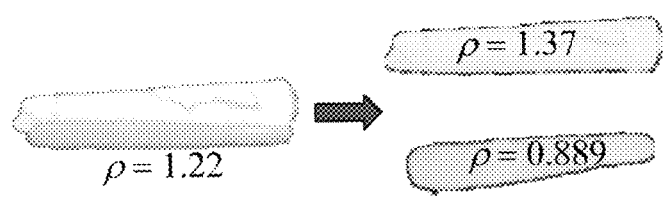
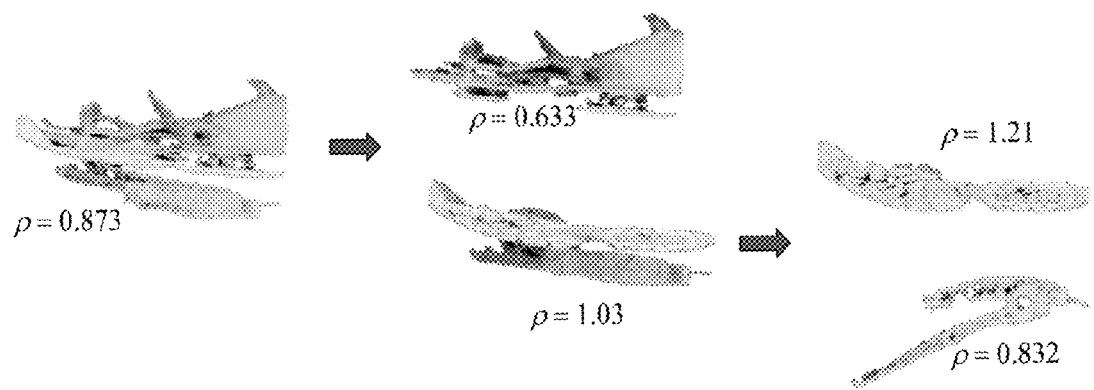
FIG. 20C

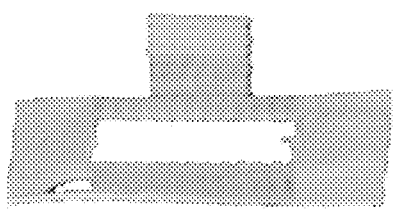 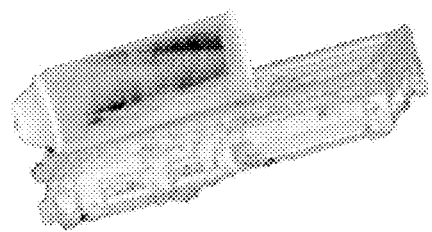
from T15 (segmented from SC 2, after histogram analysis)   from T17 (segmented from SC 5)
FIG. 21
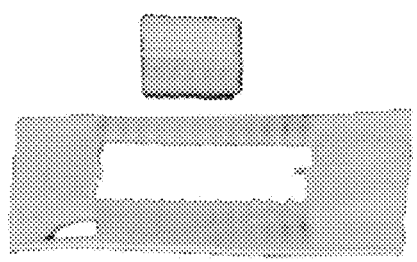 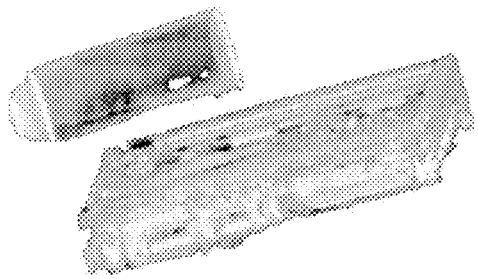
FIG. 22

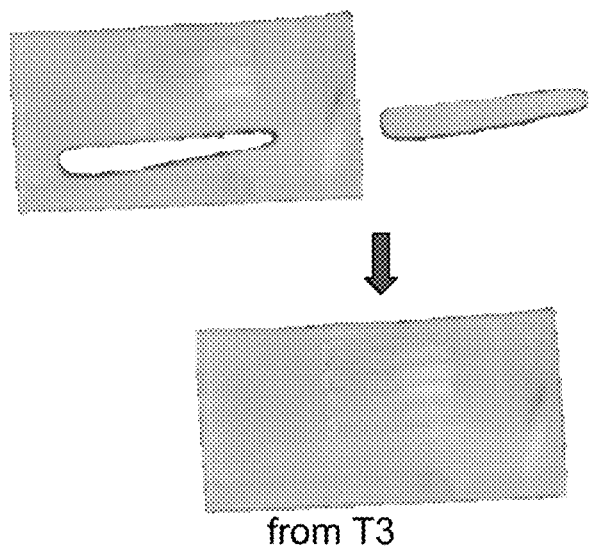
FIG. 23A
from T3
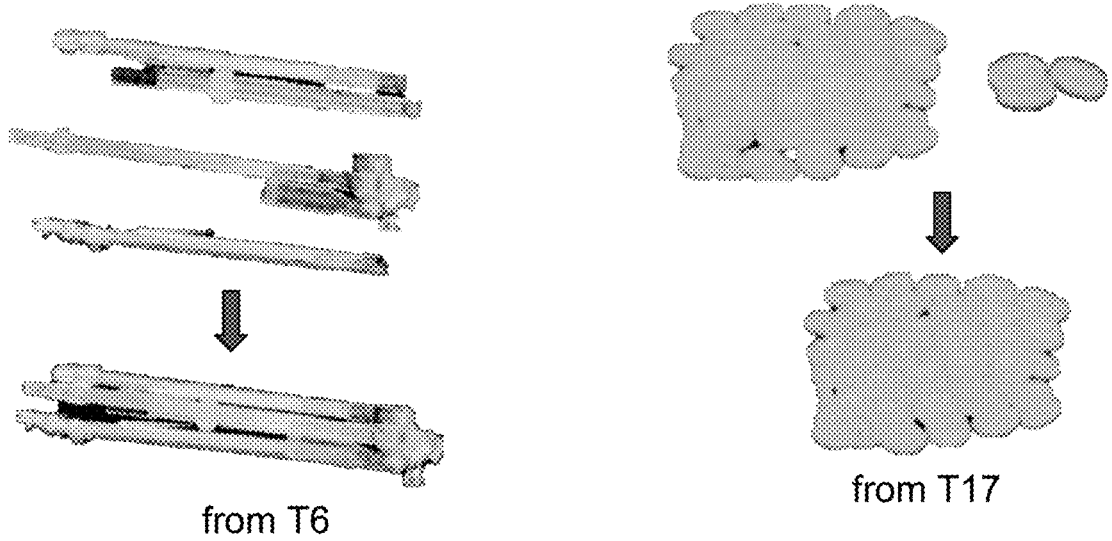
from T6
from T17
FIG. 23B  FIG. 23C

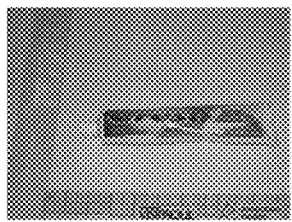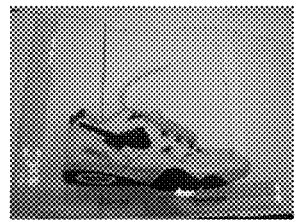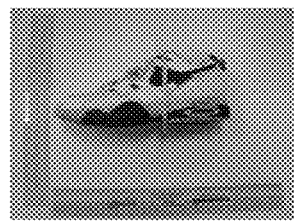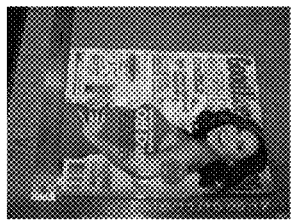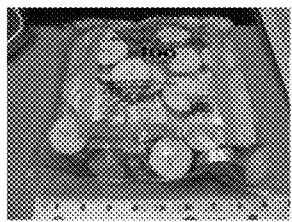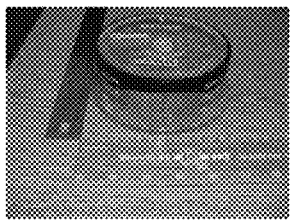
FIG. 26

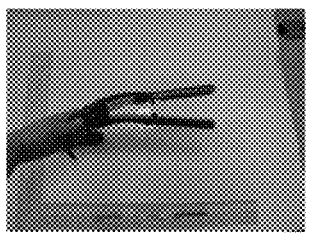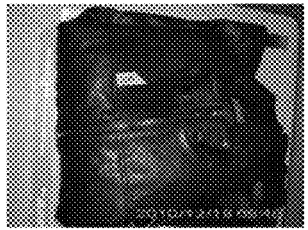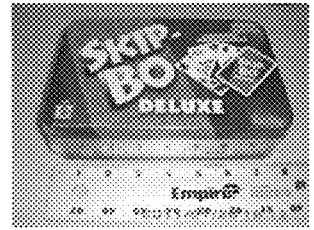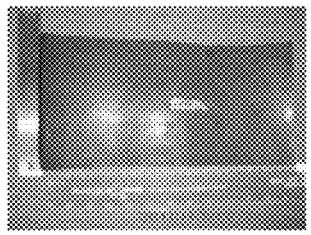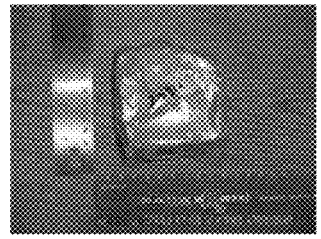
< Missing Objects >
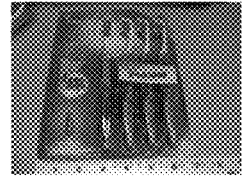
FIG. 28

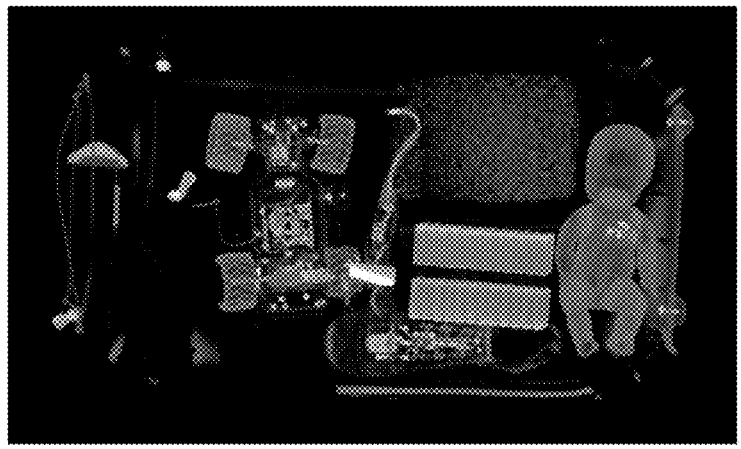
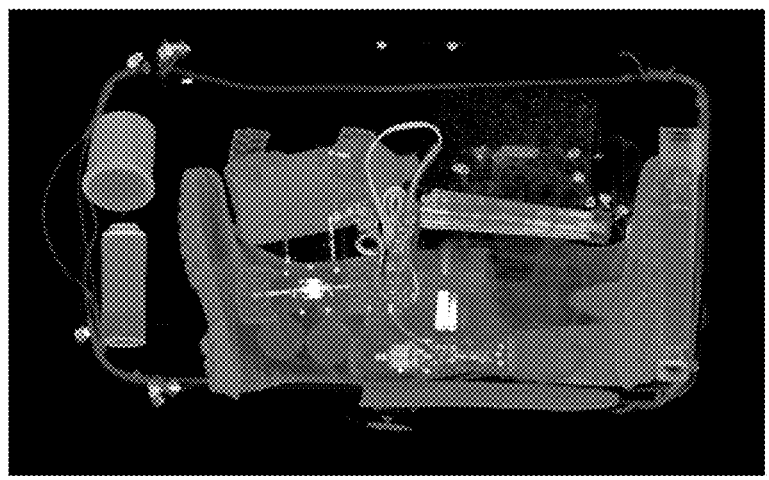
FIG. 29

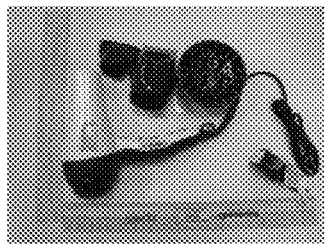
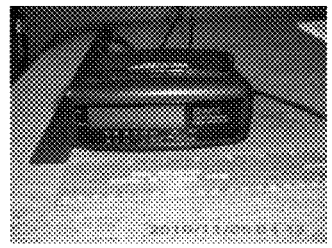
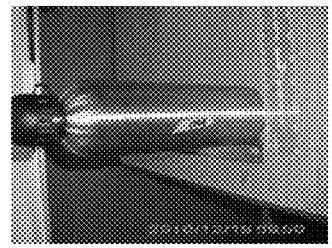
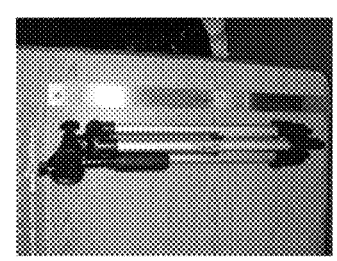
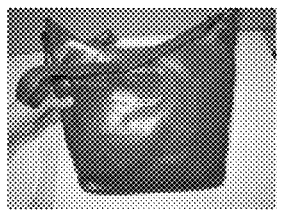
FIG. 33

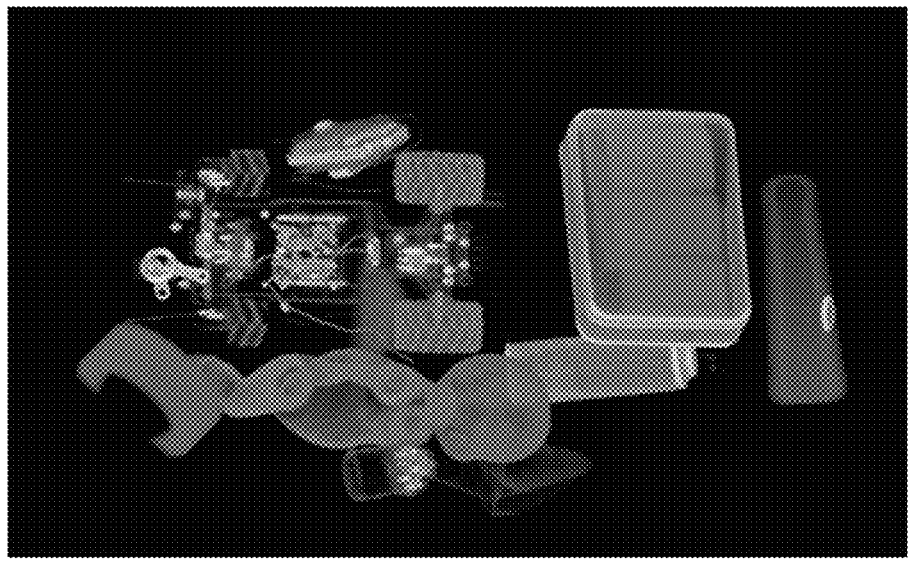
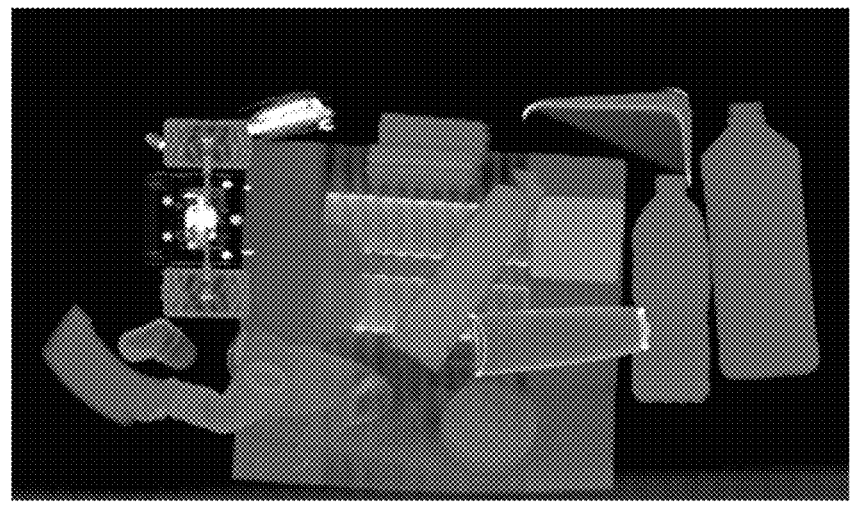
FIG. 34

Neoprene Rubber Sheet (thin)
SC3 (102.98, 0.66)
RC Car [8]
SC3(12.58, 0.59)  SC3(34.26, 0.59)
SC3 (113.25, 0.64)  SC3(10.98, 0.6)
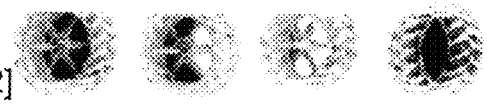
SC3         SC3         SC3         SC3
(35.25, 0.97) (34.54, 0.99) (31.99, 0.99) (20.37, 1.23)
Neoprene Rubber Sheet (thick) [2]
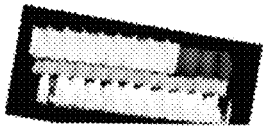
SC2 (90.35, 1.48)
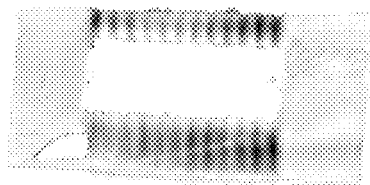
SC2 (478.73, 1)
Skip Bo [6]
SC3(34.61, 1.05)
SC1(62.21, 1.03)
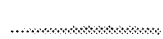
SC2(66.99, 1.05)
SC2(66.82, 1.02)
SC3(103.67, 0.97)
Doll Baby
SC3 (162.61, 1.27)
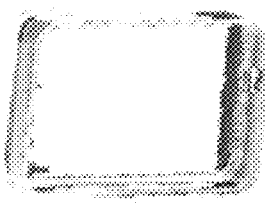
SC5(63.1, 2)
FIG. 37

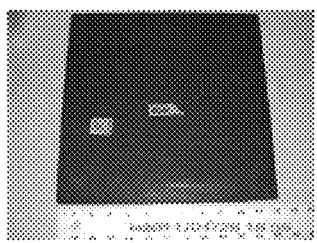 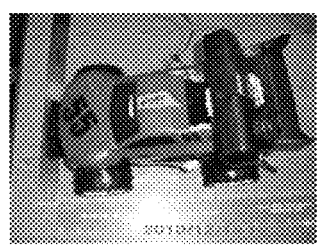 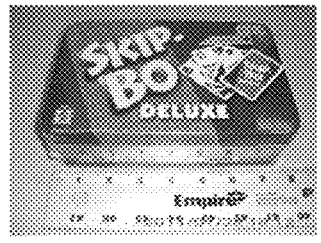
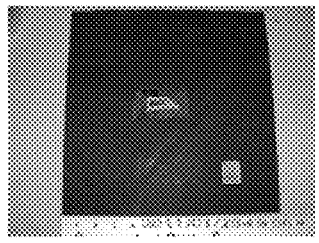 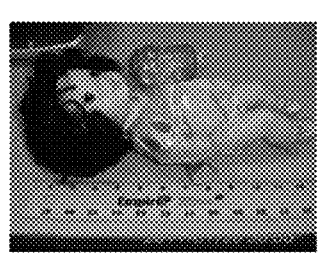
FIG. 38

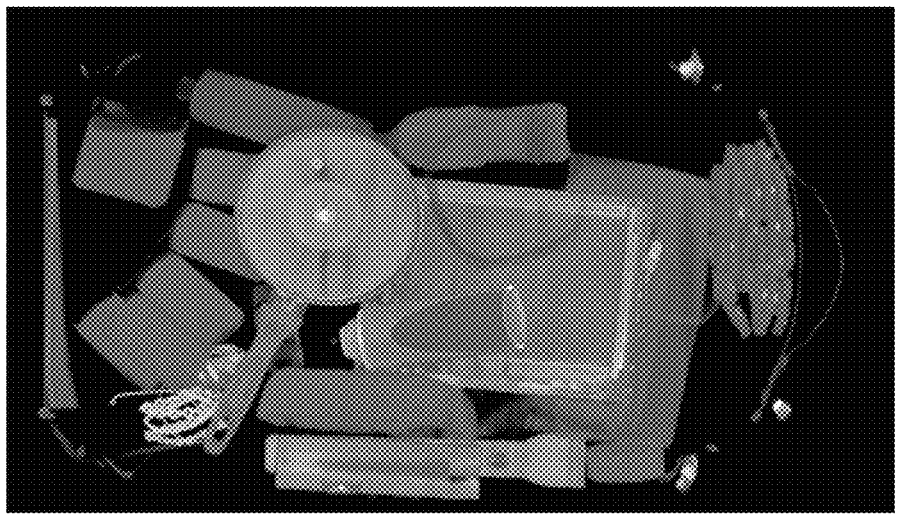
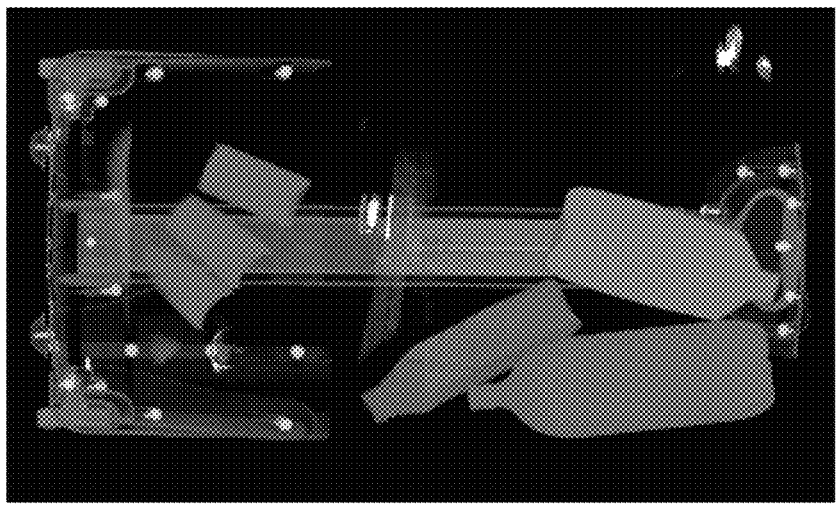
FIG. 39

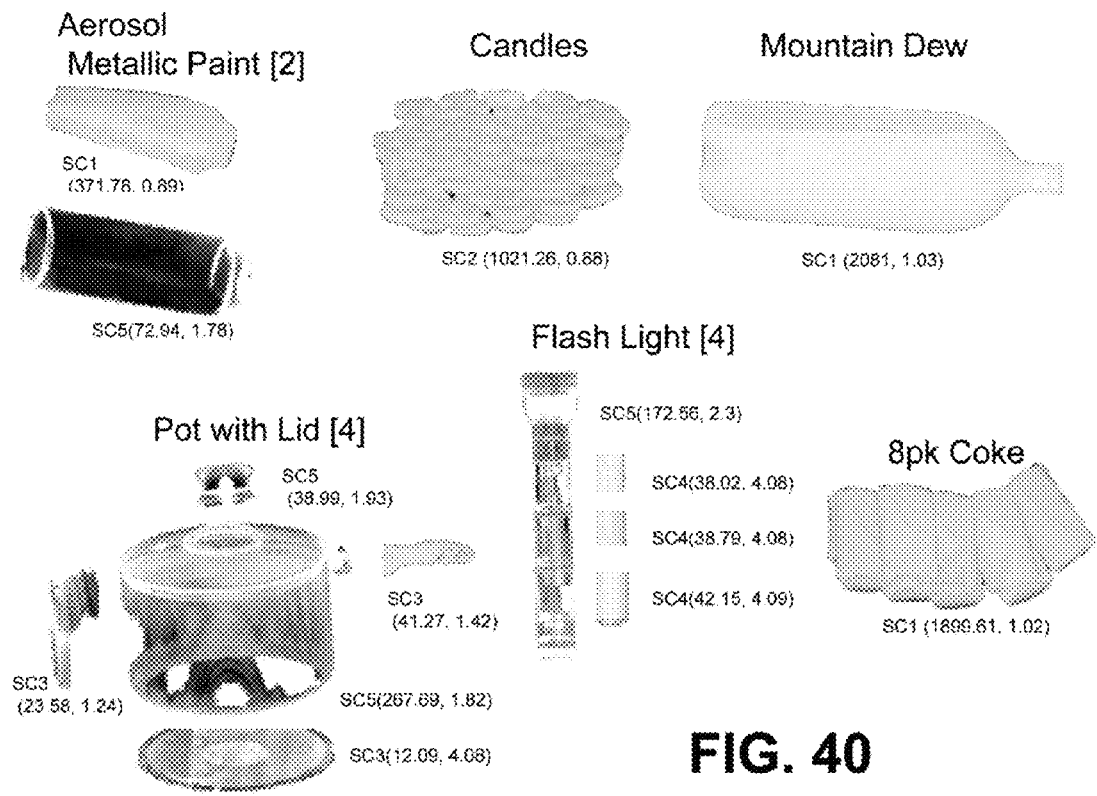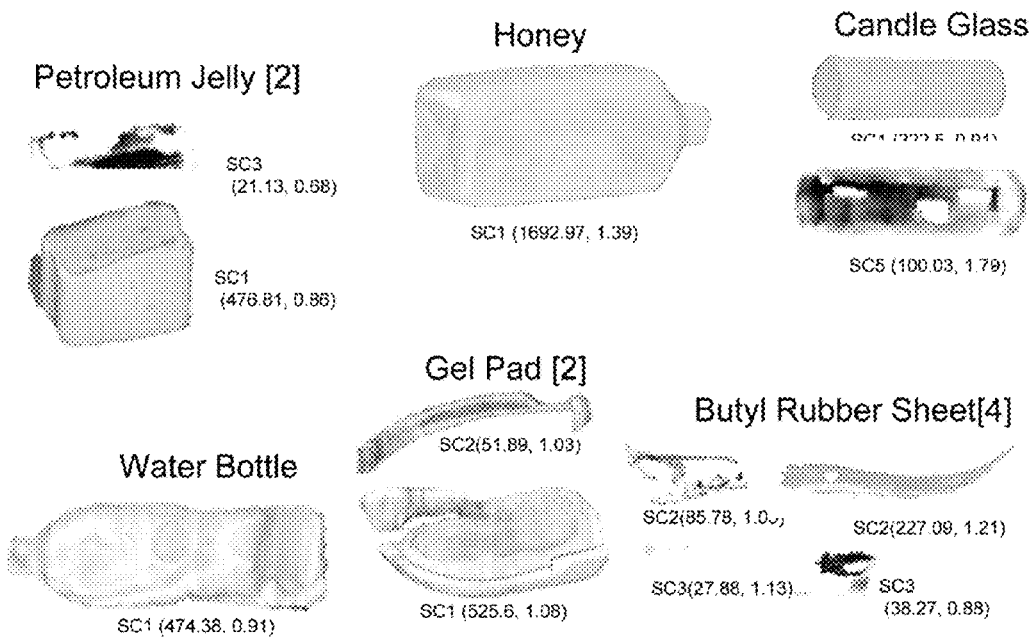
FIG. 40

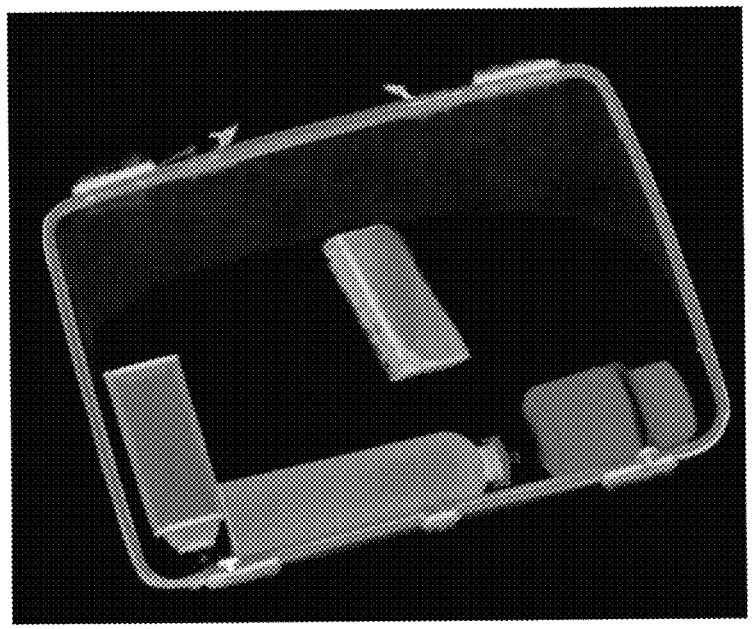
FIG. 44

EXTRACTION OF OBJECTS FROM CT IMAGES BY SEQUENTIAL SEGMENTATION AND CARVING

CROSS-REFERENCE TO RELATED APPLICATIONS

This application claims the benefit of priority of co-pending U.S. Provisional Patent Application No. 61/567,977, filed Dec. 7, 2011, entitled "Extraction of Objects from CT Bag Images by Sequential Segmentation and Carving." The disclosure of the above-referenced provisional application is incorporated herein by reference.

FIELD OF THE INVENTION

The present invention relates to extraction of objects from images, and more specifically, to extraction of objects from CT images by sequential segmentation and carving.

SUMMARY

The present invention provides for extraction of objects from CT images by sequential segmentation and carving.

Other features and advantages of the present invention will become more readily apparent to those of ordinary skill in the art after reviewing the following detailed description and accompanying drawings.

BRIEF DESCRIPTION OF THE DRAWINGS

FIG. 1 through FIG. 46 illustrate various embodiments of the present invention.

DETAILED DESCRIPTION

Figure 1:
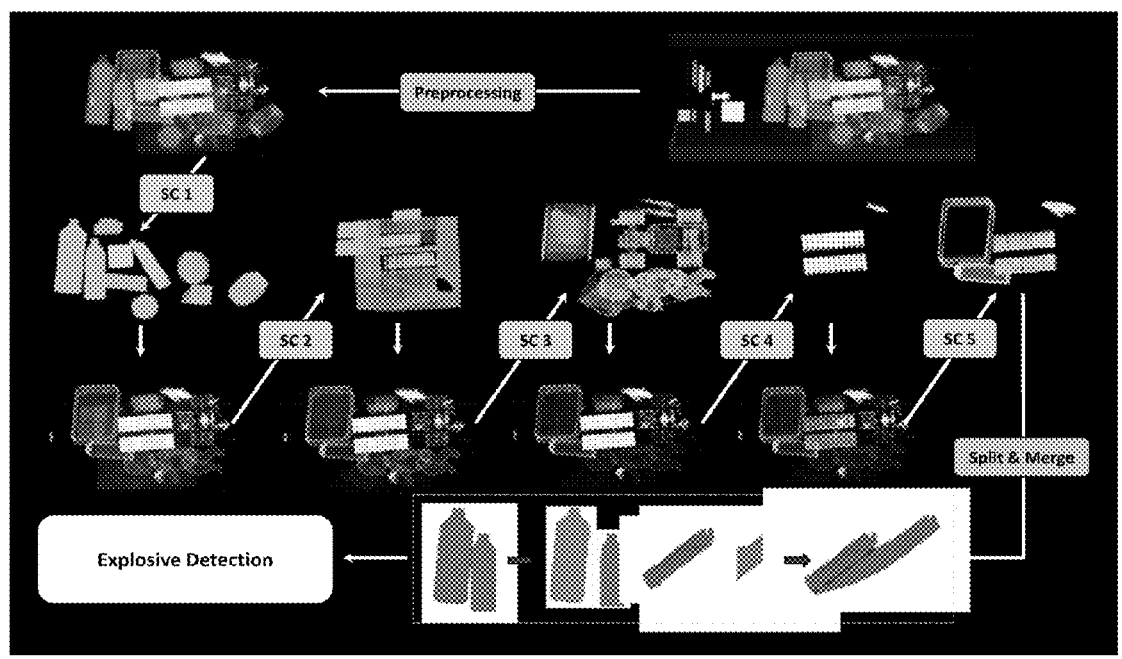

Certain implementations as disclosed herein provide for extraction of objects from CT images. After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

[Executive Summary

Modern Explosive Detection Systems (EDS) detect explosives and related threats based on the X-ray attenuation as measured by volumetric Computed Tomography (CT) scanners. All such EDS manufacturers equip the CT scanner with their own proprietary Automatic Threat Recognition (ATR) algorithm to determine the presence of explosives in passenger bags. It has been a long interest of Department of Homeland Security (DHS) and Transportation Security Administration (TSA) to improve the underlying ATR technology. The ATR technology shows that all ATR algorithms begin by determining suspect regions through some image segmentation algorithm. Advances in CT image segmentation would naturally result in the improvement in the existing ATR technology.

Awareness and Localization of Explosives Related Threats (ALERT) specified to extract all objects within the bag that satisfies: (1) the mean modified Hounsfield unit (MHU) value is greater than or equal to 500, and (2) the volume is greater than or equal to 50 cc. TSS has developed an algorithm to extract such objects satisfying the two specifications.

The TSS segmentation algorithm consists of three processing stages: preprocessing of the volumetric CT data, extraction of 3-D objects by sequential application of segmentation and carving (SC), and post-processing of segmented 3-D objects. At the preprocessing stage, the algorithm first compensates for CT artifacts through bilateral filtering that performs edge-preserving smoothing. Next, the algorithm performs five different SCs sequentially. The first SC segments bulk objects and carves them out from the volume data. The remaining SCs sequentially segments medium thickness objects, sheet objects, metallic objects, and remaining heterogeneous objects. For segmentation and labeling, we adapt symmetric region growing that does not require seed points amenable to fast execution invariant to voxel processing order. At the post-processing stage, the algorithm splits merged objects and merges split objects according to a number of heuristics. For splitting merged objects, three different splitting methods are applied: random sample consensus (RANSAC) plane fitting, recursive k-means clustering, and morphological opening. Split objects are merged based on spatial proximity, mean MHU value, and type.

The algorithm accomplishes the project goal successfully for the following five focus cases: Training Dataset 3 (T3), Training Dataset 6 (T6), Training Dataset 15 (T15), Training Dataset 17 (T17), and Validation Dataset (V12). The algorithm performs well on bulk objects (e.g., bottles of liquid, candles, nylon blocks, battery packs, etc.) and medium thickness objects (e.g., books, thick rubber sheets, etc.). It also segments heterogeneous objects well. For example, a cell phone is segmented as three objects: a leather case, an inner metallic part, and a remaining heterogeneous part. All sheet objects are segmented but usually in several smaller pieces especially for thin sheets.

The project goal is to develop an automatic (unsupervised) algorithm to perform object segmentation, the process of partitioning voxels into a list of regions, from volumetric CT data of checked baggage. Requirements for objects to be segmented are: 1) its mean MHU value is greater than or equal to 500 and 2) its aggregate volume is greater than or equal to 50 cc. Since the voxel size of CT data we handle is ($\Delta x$, $\Delta y$, $\Delta z$)=(0.98 mm, 0.98 mm, 1.29 mm), 50 cc corresponds to 40358 voxels. In practice, such requirements imply that virtually all objects except clothes should be segmented.

(a) Definition of Object

It is important that we first establish the definition of an object as the object segmentation algorithm can only be developed and evaluated against the underlying definition. The definition should expedite the construction and implementation of algorithms to classify detected (or segmented) 3-D objects based on CT measurements. While one may define objects simply by physical presentation, such as to define the "water in glass container" as a single object despite the fact that it consists of the water and the glass container, it would be prudent to define the "water in glass container" as two separate objects, namely the water and the glass container. Considering the "water in glass container" as a single object would give us the erroneous computation of density as the computed density would be somewhere in between the density of the water and the glass. However, if the container had been made of plastic, whose atomic number and density are closer to that of water, it would have been acceptable to consider the "water in plastic container" as a single object. FIG. 1 graphically illustrates the overall procedure of segmentation algorithm.

Thus, we define an object as being composed of physically contiguous homogeneous material. Object homogeneity is characterized by the difference of about 50 in MHU for adjacent voxels. Accordingly, regions segmented by an algorithm should be homogeneous so that properties such as density may be estimated from the MHU values. In addition, the detected homogeneous region should be large enough, (for instance, greater than or equal to 50 cc as specified by ALERT), so that these estimates can be determined with high confidence.

The ramifications of our object definition are as follows: a) allow the separation of a single physical object as many Cell phone into three objects (plastic case, circuit board, battery); b) whether or not to separate two touching bottles—1) of same liquid: does not matter. It is acceptable to detect a bottle of liquid as two separate objects, for instance, for hourglass shaped bottles with a very think waist—2) of different liquids: must be separated, e.g., water & alcohol.

Segmentation Algorithm (a) Overview

Figure 2A:
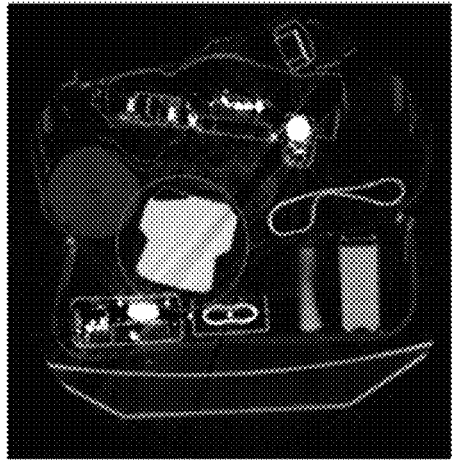
Figure 2B:
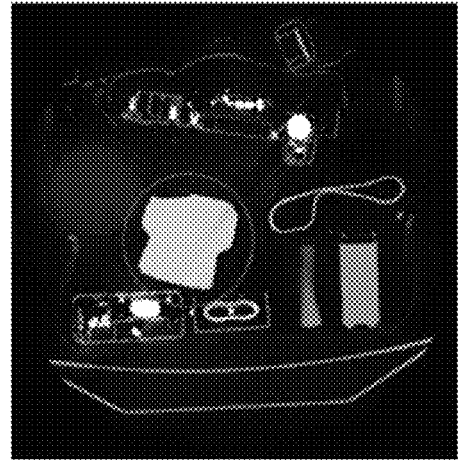

The segmentation algorithm consists of three stages: pre-processing of volume data, object segmentation by sequential application of SC, and post-processing of segmentation results. FIG. 1 shows the overall procedure of TSS segmentation algorithm. The preprocessing stage compensates for CT artifacts by applying bilateral filtering. In the segmentation stage, "Segmentation and Carving" (SC) is applied five times sequentially, each focusing on different objects. Objects segmented by each SC are then carved out from the volume data for the next SCs. The five SCs are focused on different types of objects as follows:

1. SC1: Homogeneous bulk objects
2. SC2: Homogeneous medium thickness (about 5 to 10 voxels) objects
3. SC3: Homogeneous sheet objects (less than 5 voxels across the short axis)
4. SC4: Homogeneous metallic objects (greater than MHU of 3700)
5. SC5: All remaining heterogeneous objects composed of two or more homogeneous objects FIGS. 2A and 2B show application of bilateral filtering to CT images. The display window is [0 1800]. Clearly, CT artifacts are noticeably reduced by bilateral filtering (compare regions in red circles in two images). FIG. 2A shows the original image. FIG. 2B shows after bilateral filtering.

Descriptions of specific types of objects each SC focuses on are detailed in explaining each SC in a section below. The purpose of this sequential application of SCs is to make the problem simpler by extracting objects that are easier to segment first. As a segmentation tool, we utilize the symmetric region growing (SRG) technique with a fast algorithm. Since SRG does not require seed points, it is suitable for unsupervised segmentation. The homogeneity of segmented objects is determined by a region growing parameter of SRG. The segmentation results are compensated (or refined) by splitting merged objects and merging split objects during the post-processing stage. The objects are split and merged based on the homogeneity determined by histogram analysis. We now present details of each algorithmic stage.

(b) Preprocessing: Bilateral Filtering

CT images usually suffer from various CT artifacts such as streaking, shading, and beam hardening. Effects of these artifacts are prominent in CT images of checked baggage due to the abundance of metallic objects. Such artifacts may result in over-segmentation, where a single object is split into many small regions, and erroneous grouping of objects. Therefore, it is necessary to mitigate CT artifacts for better segmentation.

In order to reduce CT artifacts, we apply bilateral filtering as preprocessing. Bilateral filtering essentially performs image smoothing while preserving sharp edges. The result of bilateral filtering on a pixel is the weighted sum of neighboring pixels, where weights are determined by two factors: domain (spatial position) and range (image value) similarities. Bilateral filtering for an image f(p) can be expressed as $$f'(p) = K \int_q [f(q) h_d(p-q) h_r(f(p)-f(q))] dq \quad (1)$$

where $h_d(p)$ and $h_r(p)$ are typically Gaussians (e.g., centered at zero with the spread $\sigma_d$ and $\sigma_r$), and K is a normalization factor so that the sum of weights is unity. Eq. (1) implies that only pixels similar in both domain and range will have larger weights, thus yielding edge-preserving smoothing.

FIGS. 2A and 2B show an example of bilateral filtering results applied to a CT image of checked baggage. Clearly, CT artifacts are noticeably reduced by bilateral filtering (compare regions in red circles in two images). The parameters $\sigma_d = 20$ and $\sigma_r = 200$ for Gaussians $h_d(r)$ and $h_r(r)$ were chosen empirically that resulted in visually pleasing regions. The bilateral filter processed the 3-D images slice-by-slice. Although 3-D bilateral filtering is possible and may yield better results, we opt for 2-D bilateral filtering considering computational costs.

(c) Segmentation and Carving (i) Symmetric Region Growing

The segmentation algorithm utilizes symmetric region growing (SRG) that does not require seed points. SRG grows a region using a symmetric region growing function g(p,q):

$$g(p,q) = \text{TRUE} \rightarrow p \text{ and } q \text{ belongs to the same region.} \quad (2)$$

The symmetric region growing function we actually use is $$g(p,q) \equiv |f(p)-f(q)| \leq c. \quad (3)$$

Since p and q in Eq. (3) are interchangeable, Eq. (3) is symmetric. SRG ensures segmentation results invariant to voxel processing order. Furthermore, a fast algorithm for SRG exists with O(N) complexity, where N is the total number of voxels.

Setting c differently results in different segmentation results. Larger c usually results in under-segmentation (different objects grouped into a single region) and smaller c results in over-segmentation (a single region segmented in many pieces). By selectively processing voxels within a window of MHUs, $I_1 \leq f(p) \leq I_2$, we can segment characteristically different objects with different c. Therefore, we define Segmentation and Carving function $SC(I_1, I_2, c)$ that performs the following sequentially:

Segmentation and Carving, $SC(I_1, I_2, c)$

Obtain a binary mask by thresholding with $I_1$ and $I_2$.

Perform processing of the binary mask.

Perform SRG with c and Eq. (3) for voxels selected by the processed binary mask.

Carve out segmented objects for next SC steps.

(ii) SC1 for Homogeneous Bulk Objects

SC1 focusing on homogeneous bulk objects takes Segmentation and Carving, SC(600,2000,50). For processing of the binary mask, morphological opening is performed with a 11×11×11 cube as a structuring element. Since opening is erosion followed by dilatation [3], we can remove regions with local thickness less than 11 voxels. Here, one voxel is approximately 1 mm and thus 11 voxel will result in bulk objects whose shortest axis will be greater than approximately 1 cm. As a result of opening with a 11×11×11 cube, SRG can segment only relatively bulky objects. There is a volume constraint in SC1 that a segmented object volume should be greater than or equal to 50 cc.

Figure 3A:
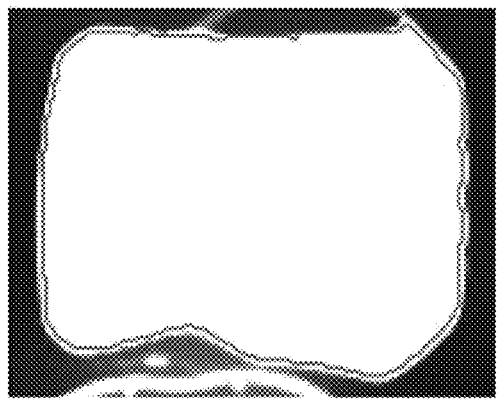
Figure 3B:

FIGS. 3A and 3B show boundary adjustment by Chan-Vese method. FIG. 3A shows original boundary, and FIG. 3B shows after After boundary adjustment.

Since SC involves thresholding with $I_1$ and $I_2$, boundaries of segmented objects do not accurately match with real object boundaries due to the partial volume effect. As a result, the volume of the segmented object is typically smaller than its actual volume. To adjust the object boundaries, we apply a level set-based active contour technique, which is popular in medical image segmentation. Segmentation by level set-based active contours is to find a contour represented by a level set function that minimizes an energy functional composed of an internal term related to contour smoothness and an external term related to image information. We specifically use the Chan-Vese method based on region-based Mumford-Shah energy functional. Although 3-D formulation of the Chan-Vese method is straightforward, we opt for 2-D formulation considering computational costs (as in the case with bilateral filtering). We apply the Chan-Vese method three times slice-by-slice in x-y, y-z, and x-z slices. FIG. 3 shows an example of boundary adjustment by the Chan-Vese method. Boundary adjustment increases the volumes of segmented objects about five percent on average when compared to the original boundary. The visual check of FIGS. 3A and 3B show the adjusted contour in 3B appears to be a better fit for the segmented region compared to the original contour shown in 3A. After performing boundary adjustment, those segmented objects are carved out from the volume data.

(iii) SC2 for Homogeneous Medium Thickness Objects

SC2 focusing on homogenous objects with medium thickness takes SC(600,2000,50), which is the same as SC1. The difference between SC1 and SC2 lies in the structuring element used in binary mask processing. In SC2, a 5×5×5 cube is used for opening of the binary mask, and the volume threshold is 10 cc. (In the remaining SC3, SC4, and SC5, volume thresholds are all 10 cc.)

(iv) SC3 for Homogeneous Sheet Objects

SC3 focusing on homogeneous sheet objects takes SC(400,1500,50). Note that the lower threshold $I_1$ is lowered from 600 to 400 compared with SC1 and SC2 in consideration of partial volume effect of thin sheet objects. In SC3 and the remaining SC4 and SC5, the binary mask processing is different from that in SC1 and SC2. Instead of opening with a cube structuring element, the binary mask is convolved with a 7×7×7 kernel of 1's, and voxels whose count is below a threshold (80) are removed. By this selective removal process, voxels considered as having weak connections between different objects can be removed and the remaining small regions (after carving from previous SCs) can be cleaned up.

Figure 4:
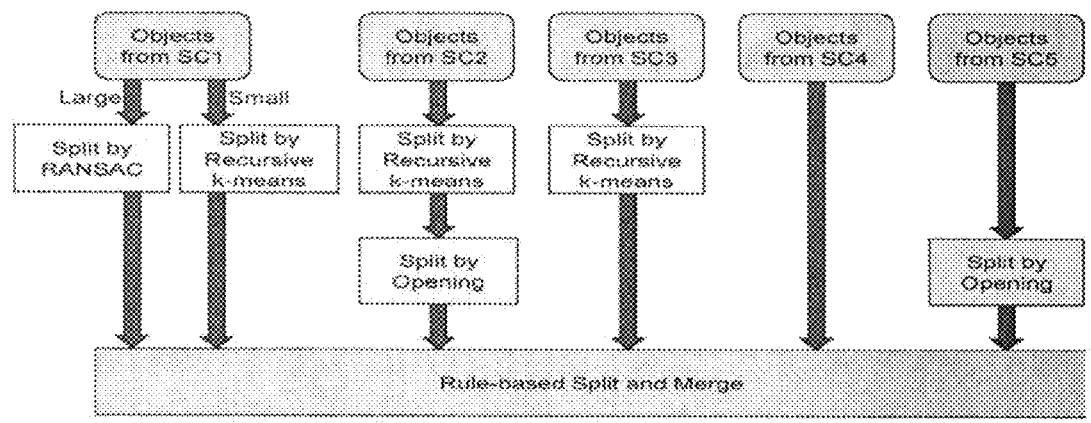

FIG. 4 is a flow chart of object splitting and merging in the post-processing stage.

Figure 5:
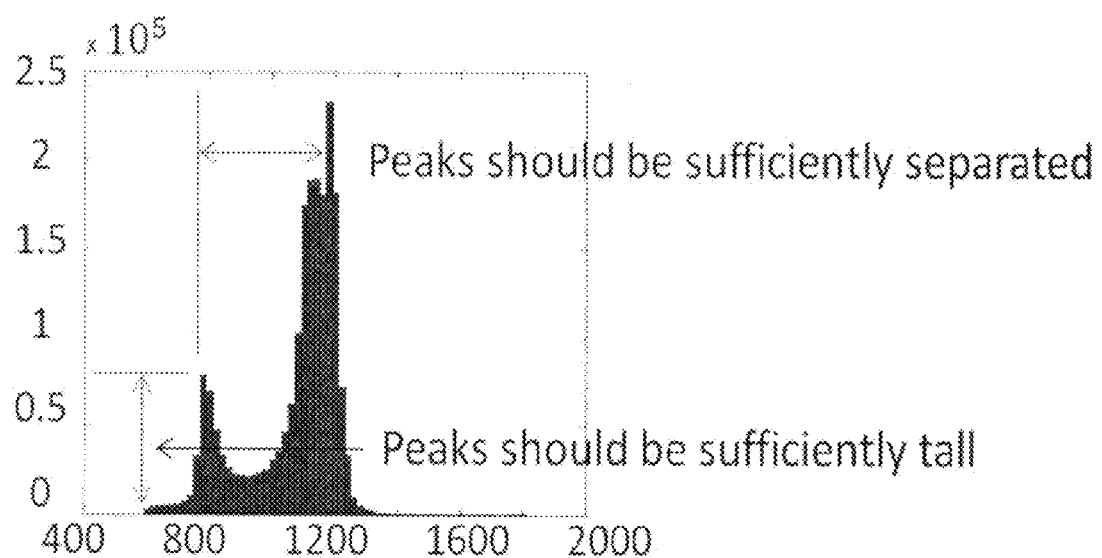

FIG. 5 is an example of the object histogram. If there are multiple peaks in the histogram that are separated well and sufficiently tall, the object should be split.

(v) SC4 for Homogeneous Metallic Objects

SC4 focusing on homogeneous metallic objects takes SC(3700,MAX,50) where MAX is the maximum value of CT images (4095 for our dataset). The binary mask processing is the same as SC3.

(vi) SC5 for Remaining Heterogeneous Objects

SC5 focusing on remaining heterogeneous objects takes SC(1200,MAX,300). The binary mask processing is the same as in SC3. Note that a considerably large c is used to effectively compensate for variability in MHU values in heterogeneous objects.

(d) Post-Processing: Split and Merge

Since SRG is purely based on only MHU values as well as voxel positions, the segmentation will generate objects of different materials that are merged together when they touch. In addition, because of CT artifacts and binary mask processing, the segmentation will generate multiple objects from a single object. Therefore, we refine segmentation results by splitting merged objects and merging split objects at the post processing stage. FIG. 4 shows a flow chart of object merging and splitting in the post-processing stage.

Figure 6A:
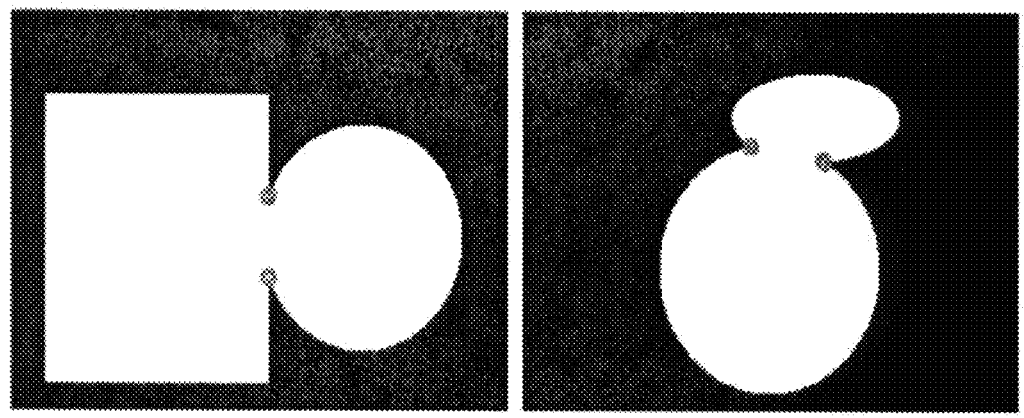
Figure 6B:
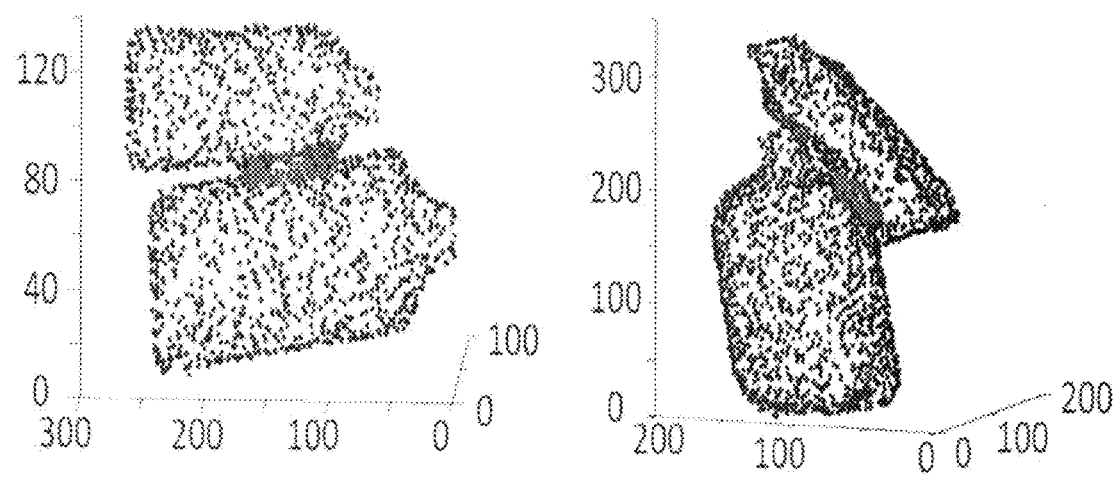

FIG. 6 shows detected boundary points common to both objects. FIG. 6A shows 2-D simulation cases, and FIG. 6B shows 3-D real cases.

FIG. 7 shows examples of split merged objects by RANSAC-based plane fitting from (a) T15 (70% isopropyl alcohol and water), (b) T17 (Mountain Dew and motor oil), and (c) V12 (organic stack and aerosol metallic paint).

(i) Object Splitting Based on Histogram Analysis

As mentioned previously in Section 1, we allow objects of the same material, i.e., similar in MHU values, to merge. Thus, we determine whether an object should be split or not based on its histogram of MHU values. As shown in FIG. 5, if there are multiple peaks in the object histogram that are separated well and sufficiently tall, the object should be split. We apply this histogram analysis for objects segmented from SC1, SC2, and SC3 whose volume is greater than 100 cc. Since all objects segmented from SC4 are virtually all homogeneous, there is no need for histogram analysis. Similarly, since SC5 groups all remaining heterogeneous objects, there is also no need for histogram analysis.

(ii) Object Splitting by RANSAC-Based Plane Fitting

In order to split large merged objects segmented from SC1 whose volume is greater than 500 cc, we first detect the boundary points that are common to both objects. At each boundary voxel, we calculate the number of object voxels within an 11×11×11 window surrounding the voxel. At the boundary points where objects merge, those numbers are usually much greater than those at other boundary points. For, we classify voxels whose calculated numbers are greater than the threshold as voxels at common boundary points. FIG. 6 shows boundary points that are common to both objects for simulated 2-D images and real 3-D CT images.

Next, we find the best-fitting plane at the detected points and split the object using the best-fitting plane. We use RANSAC to fit a plane to detected points. RANSAC is an iterative method to robustly estimate parameters of a model from a set of observed data with outliers [7]. In spite of possible outliers in detected touching points, we can find a good cutting plane through RANSAC. FIG. 7 shows objects separated by planes found by RANSAC.

FIG. 8 shows xamples of split merged objects by recursive k-means clustering from T3. (a) Candles and butyl rubber sheet. (b) Toothpaste and magazine. (c) Sneaker and flat iron. FIG. 9 shows examples of split merged objects by opening from (a) T15 (crayons and neoprene rubber sheet) and (b) T17 (container of aerosol and laptop).

(iii) Object Splitting by Recursive k-Means Clustering

For merged objects from SC2 and SC3, and small merged objects from SC1 whose volume is less than 500 cc, we apply k-means clustering instead of RANSAC-based plane fitting. This is because shapes of smaller objects are usually more irregular than those of larger objects. k-means clustering is a cluster analysis method that partitions observations into k clusters based on the distance from cluster centers. k-means clustering iteratively finds cluster centers and partitions that minimize with-in cluster distances. For splitting purposes, we recursively apply k-means clustering with k=2 until all split objects are homogeneous (passes the histogram analysis test). FIG. 8 shows examples of object splitting by the recursive k-means clustering.

(iv) Object Splitting by Opening

In the final step of object splitting, we split objects based on differences in thickness. We observe the possibility that both thin and relatively thick objects are segmented and merged together from SC2 and SC5. Therefore, we split these merged objects by applying opening with a 15×15×15 cube for binary masks of objects because only thin objects can be removed by opening. To prevent thin parts of an object, such as a plastic case of a laptop, from being removed by opening, closing (dilation followed by erosion) is first performed. This splitting by opening method is performed regardless of histogram analysis for all objects (whose volume is greater than 100 cc) segmented from SC5 and SC2 after splitting by recursive k-means clustering. FIG. 9 shows examples of objects split by opening.

FIGS. 10A to 10C show examples of merged split objects from (a) T3 (magazine), (b) T6 (tripod), and (c) T17 (candles).

(v) Object Merging

We merge split objects based on the following three criteria: spatial proximity, mean MHU value, and type of objects (bulk, medium thickness, and sheet). Spatial proximity is determined by the nearest distance between the boundaries of objects. The type is represented by the mean of distance transform of the object binary mask. Since the distance transform assigns a distance to the nearest boundary to each voxel, its mean values will be smaller for thin objects and larger for bulk objects. Objects that satisfy all three criteria defined by threshold values are merged into a single object. Threshold values used for the boundary distance, mean MHU value, and mean of distance transform are 5 voxels, 150, and 0.2, respectively. FIG. 10 shows examples of merged split objects.

(e) Results

We tested the performance of the TSS segmentation algorithm for five focus cases, T3, T6, T15, T17, and V12. The quality of segmentation results can be visually checked from presentation slides attached at the end of this report. (When comparing our results to the provided reference labels, please refer to the PowerPoint slides.) Objects marked by green letters (from the slides) indicate that the object volume is greater than 10 cc (our own volume constraint) and less than 50 cc (volume constraint of the project).

The segmentation algorithm performs well on homogeneous bulk objects such as bottles of liquids (water, various beverages, honey, oil, aerosol, etc.), blocks of clay and nylon, candles, pieces of steel, and battery packs. Note that steel bottles and glass candle holders are successfully segmented as separate objects. The algorithm also performs well for homogeneous medium thickness objects such as books, magazines, and thick rubber sheets. The algorithm segments heterogeneous into homogeneous and heterogeneous components. For instance, a cell phone is segmented into a leather case (homogeneous), inner metallic part (homogeneous), and remaining heterogeneous part. All sheet objects are segmented by the algorithm but usually in several smaller pieces. Very small metallic objects such as batteries in tooth brushes are missed because of the volume constraint of the algorithm (10 cc).

The limitations of the algorithm are summarized as follows:

Thin rubber sheets are segmented into several smaller pieces.
MHU values of thin rubber sheets are spread over from 0 to 600-800 across 7-10 voxels In SC3, thresholding with $I_1$=400, $I_2$=1500, the resulting binary mask for thin rubber sheets becomes about 2-3 voxels thick, where in reality, the actual sheets can be greater than 6-7 voxels thick, especially because the given scanner's PSF was found to be over 6 mm. Recall that voxel size is about 1 mm for the given scanner.

In some cases, the mask becomes 1 or 0 voxel wide due to streaks from CT artifacts, resulting in objects being split into several smaller pieces Partial volume compensation processing is needed The scanner appears to have PSF with FWHM of about 3-4 mm A 3 mm sheet shows up as a sheet of about 6 voxels FWHM with MHU of ~600

It fails to correctly segment the stack of sheet objects in V12.

We segmented it as a single large bulk object as all sheets have similar MHU.

(i) Quantitative Performance Analysis

Recently, Lawrence Livermore National Laboratory (LLNL) defined two metrics to evaluate segmentation results quantitatively: "Wholeness" (W) and "Exclusiveness" (E). W measures how much of a ground truth object (G) is captured by a segmented region (S) and can be expressed as $$W = \frac{\text{area}(G \cap S)}{\text{area}(G)}. \tag{4}$$

E measures how much of S is made up of G and can be expressed as $$E = \frac{\text{area}(G \cap S)}{\text{area}(S)}. \tag{5}$$

Figure 11:
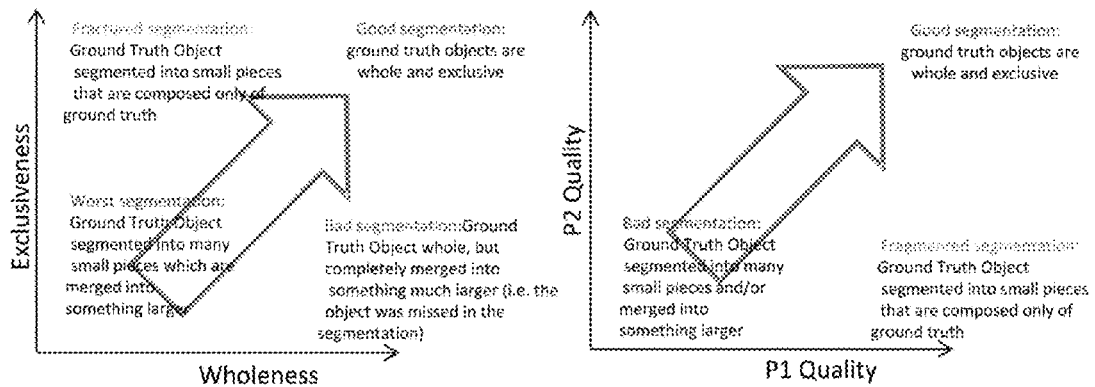

When both W and E are high, segmentation results for S can be regarded as good. With W and E, "P1Quality" ($Q_{P_1}$) and "P2Quality" ($Q_{P_2}$) are defined for S as $$Q_{P_1} = \sum_{i=1}^{n} W_i \cdot E_i, \tag{6}$$

$$Q_{P_2} = \sum_{i=1}^{n} W_i^2 \cdot E_i, \tag{7}$$

where n is the number of segmented regions in S. While $Q_{P_1}$ penalizes merging more than splitting, $Q_{P_2}$ penalized both merging and splitting. When both $Q_{P_1}$ and $Q_{P_2}$ are high, segmentation results for S can be regarded as good. FIG. 11 graphically illustrates the relationship between the quality of segmentation and the four metrics, W, E, $Q_{P_1}$, and $Q_{P_2}$.

FIG. 11 graphically illustrates relations between segmentation quality and four metrics defined by LLNL, "Wholeness", "Exclusiveness", "P1Quality", and "P2Quality". Images are extracted from the PowerPoint slides provided by LLNL.

Figure 12A:
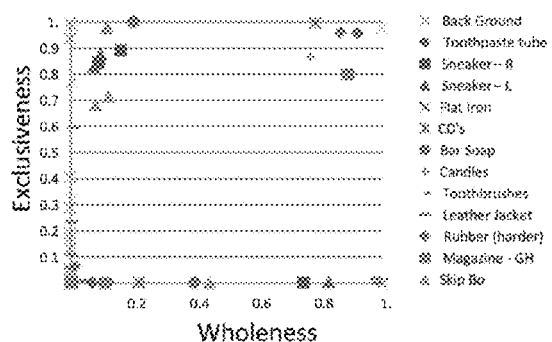
Figure 12B:
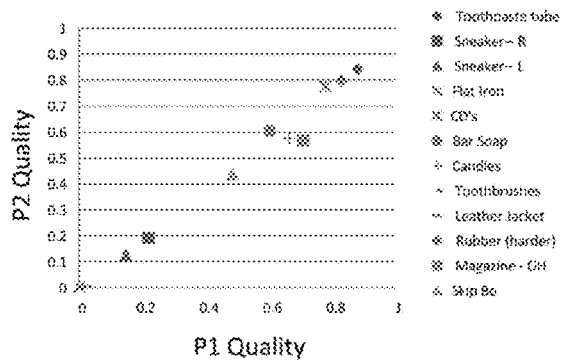
Figure 19A:
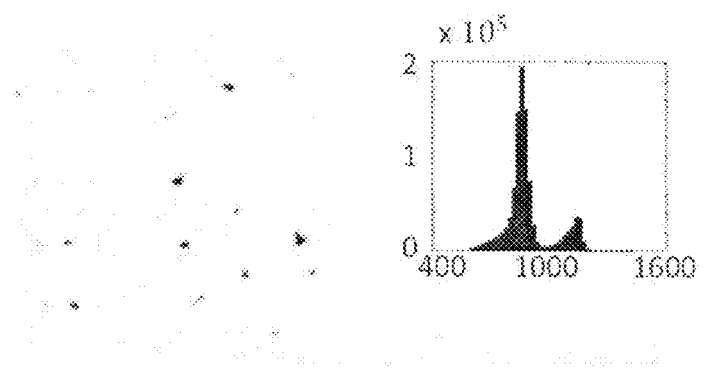
Figure 19B:
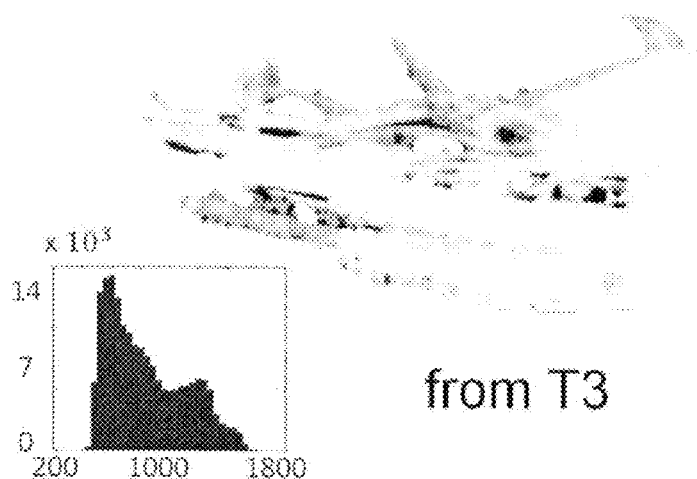
Figure 19C:
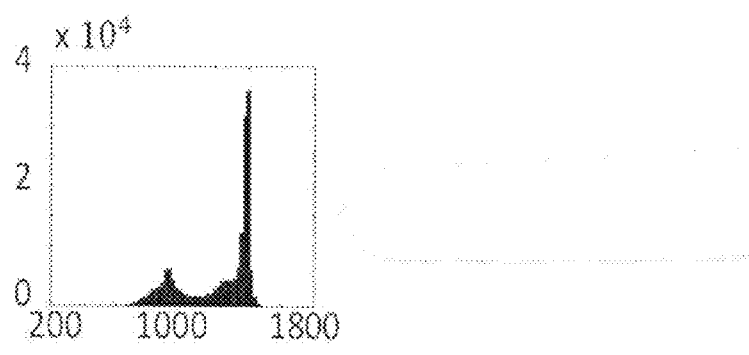
Figure 24A:
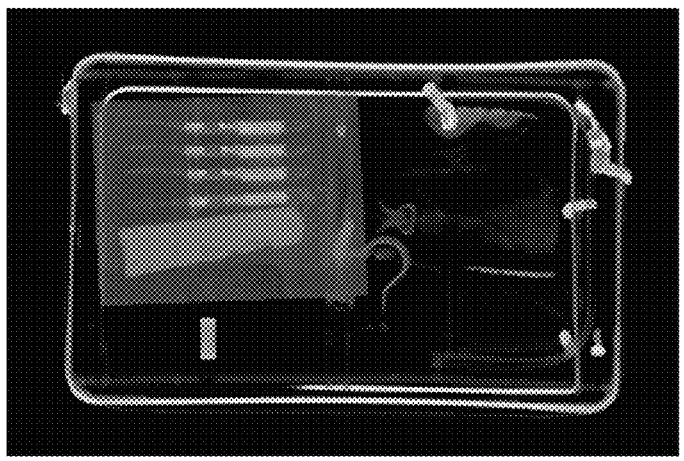
Figure 24B:
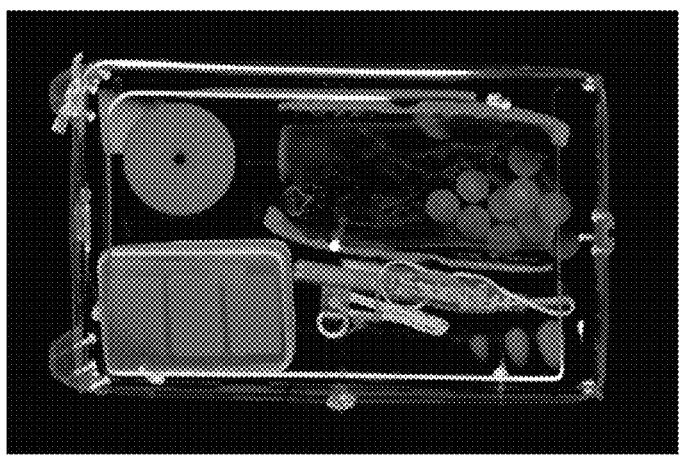
Figure 24C:
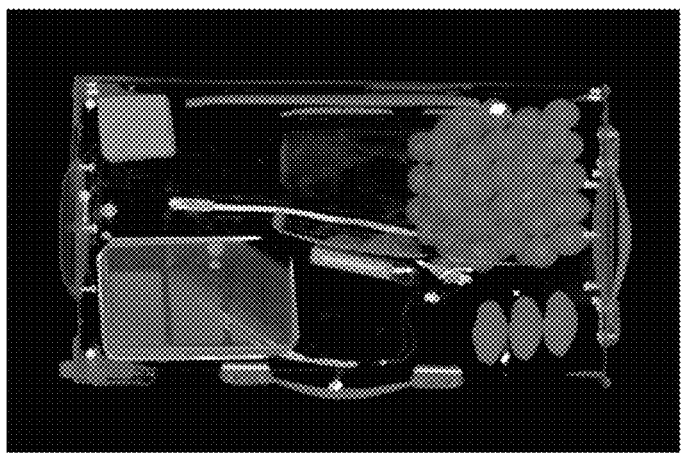
Figure 25:
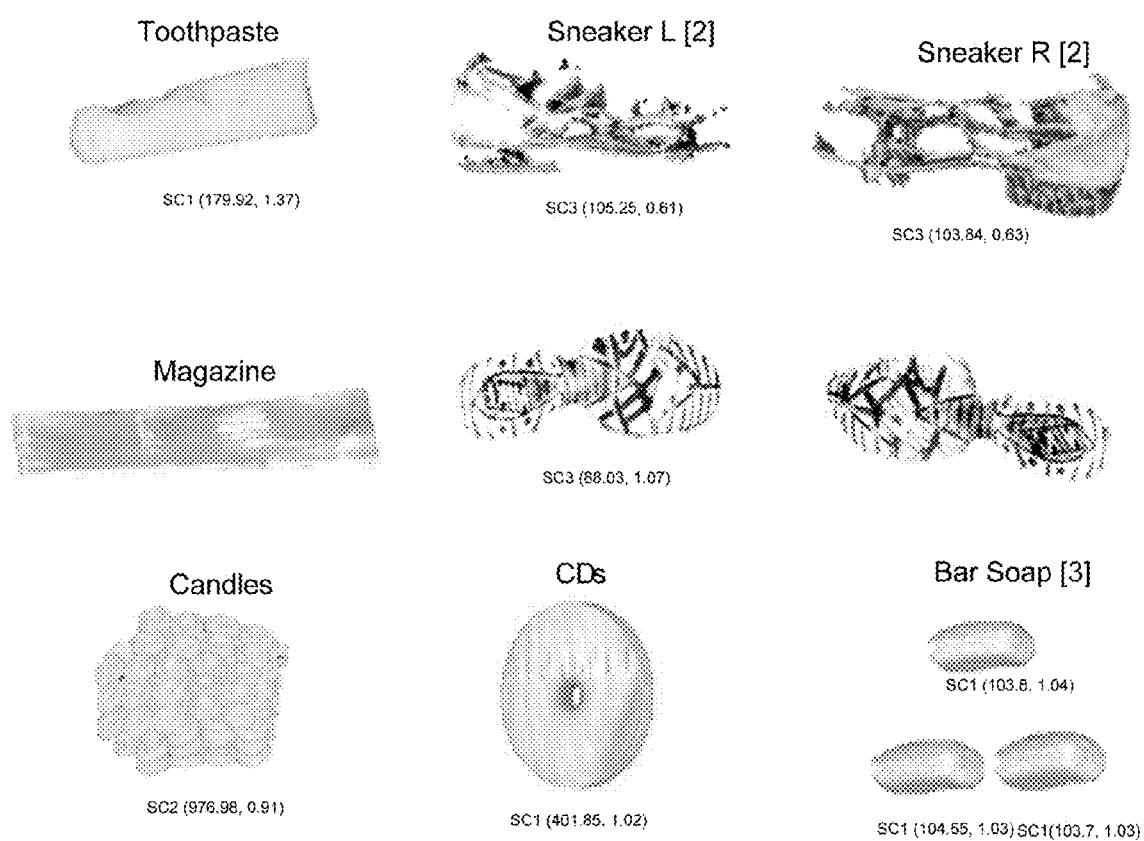
Figure 27:
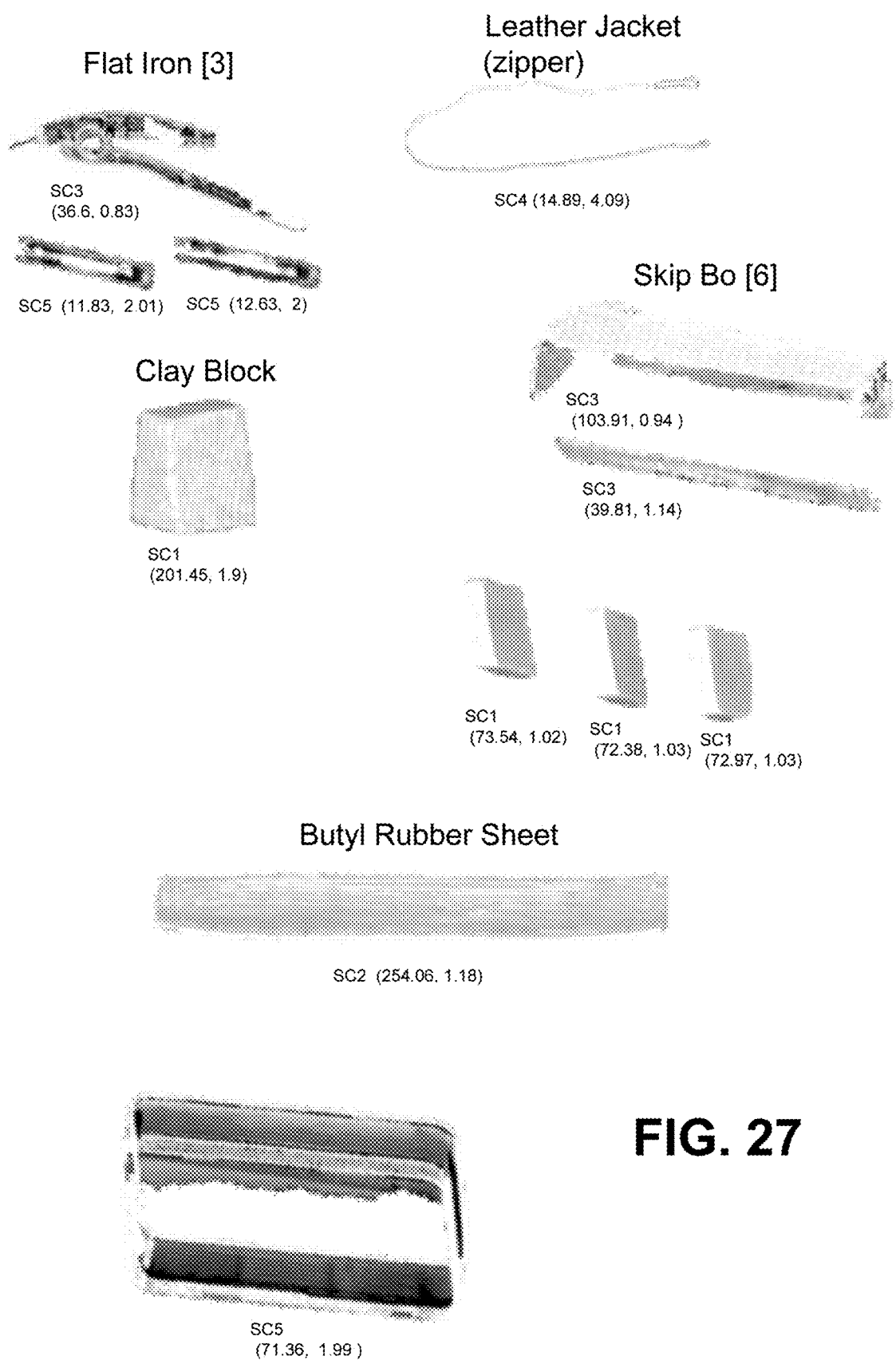
Figure 30:
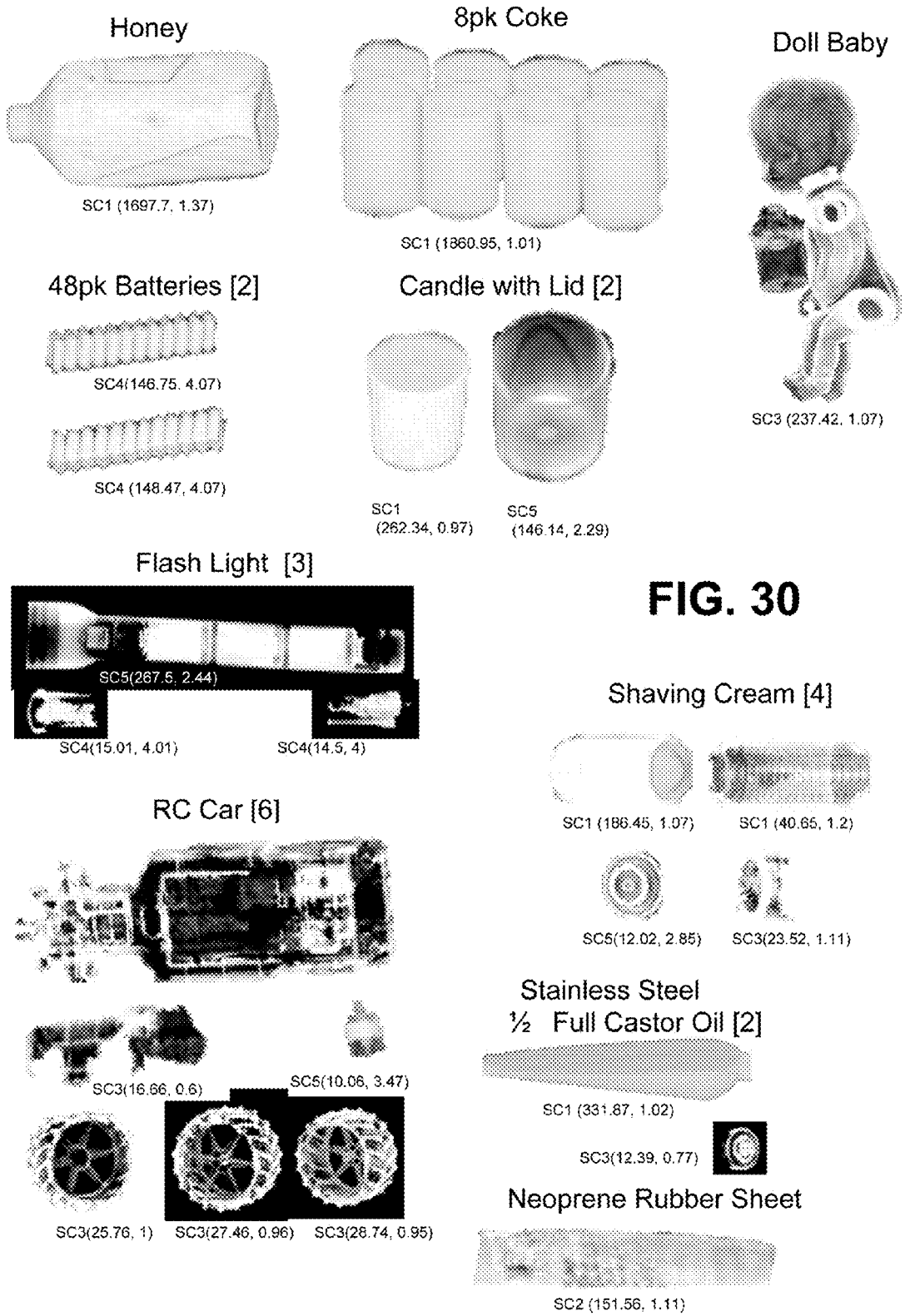
Figure 31:
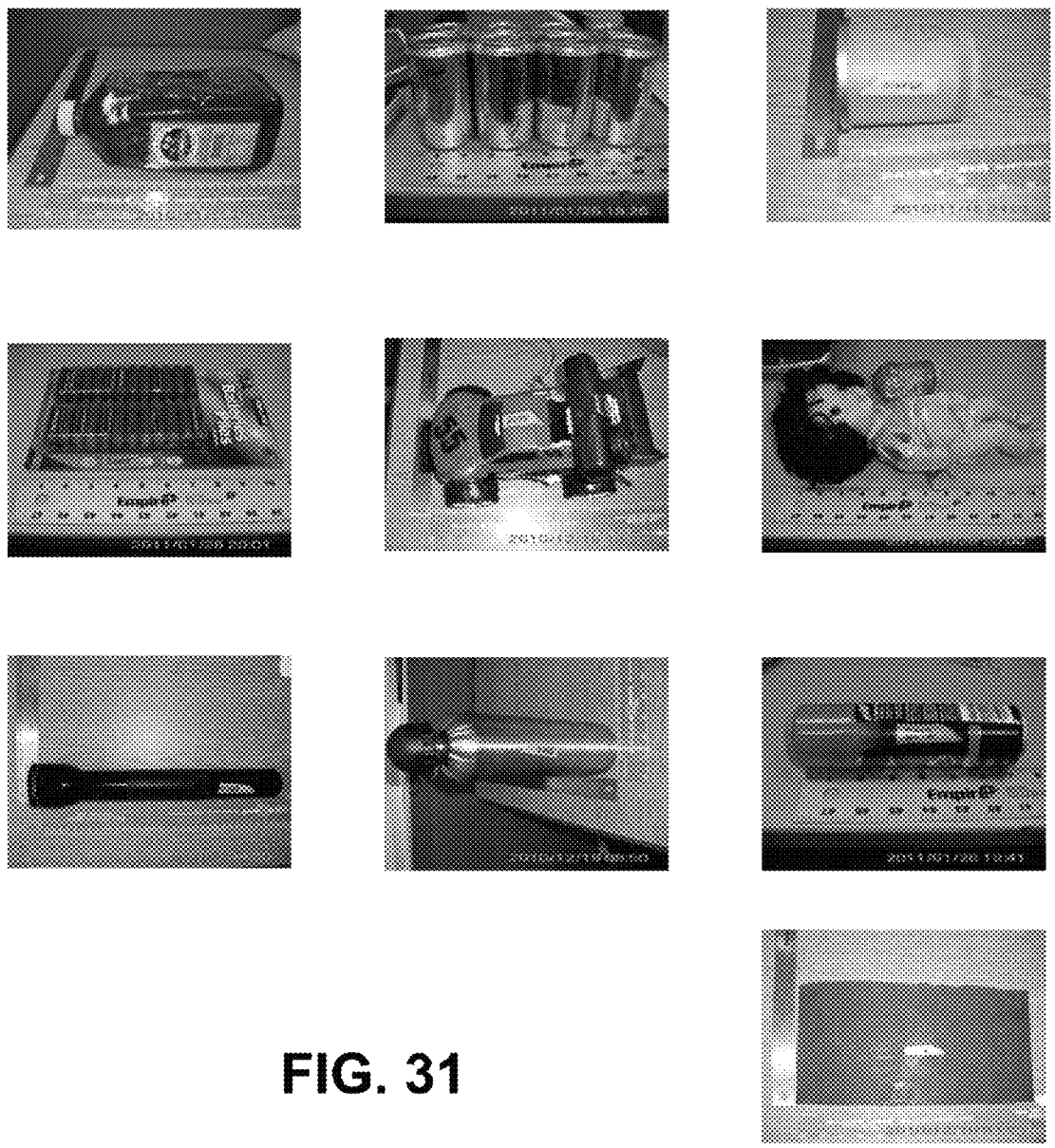
Figure 32:
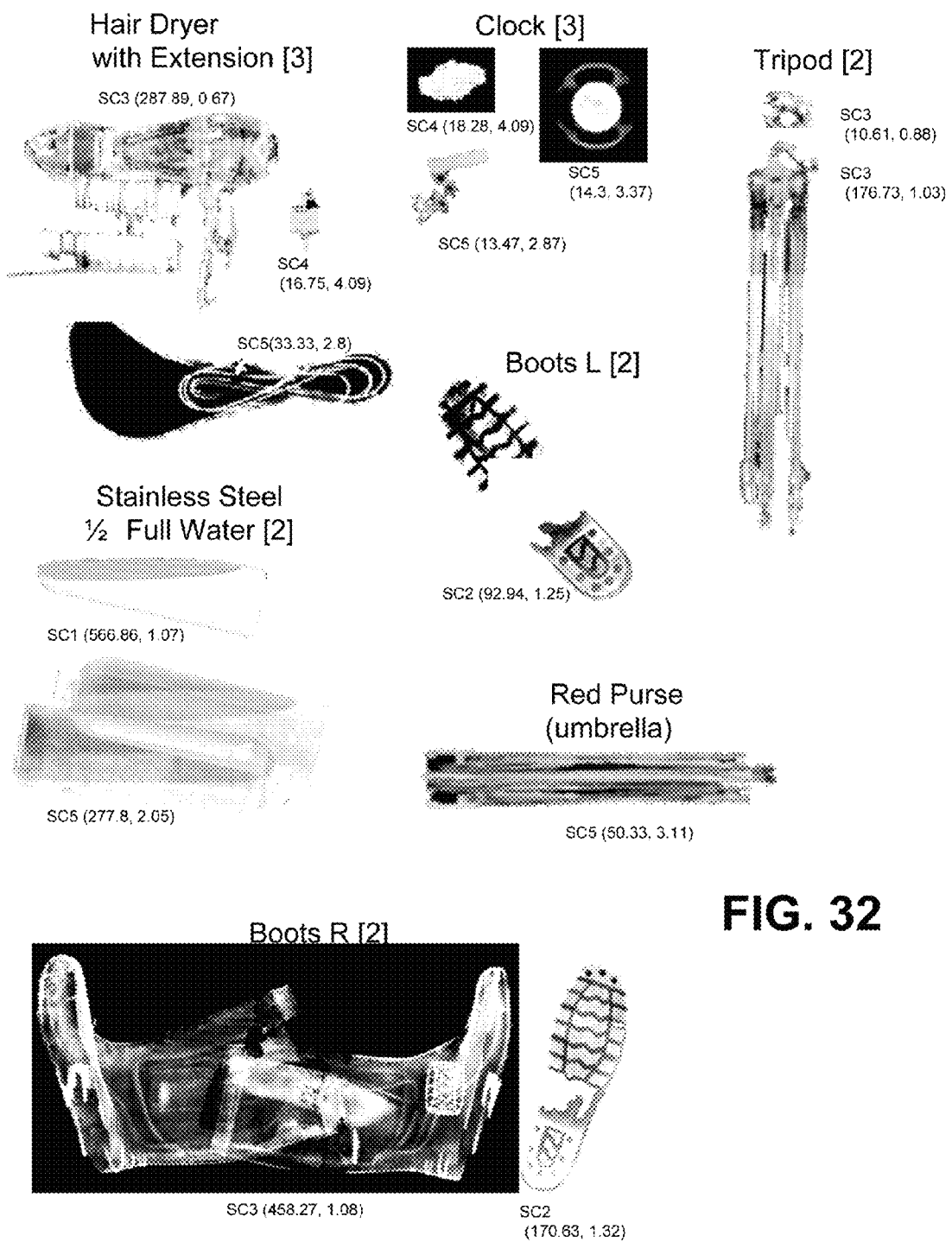
Figure 35:
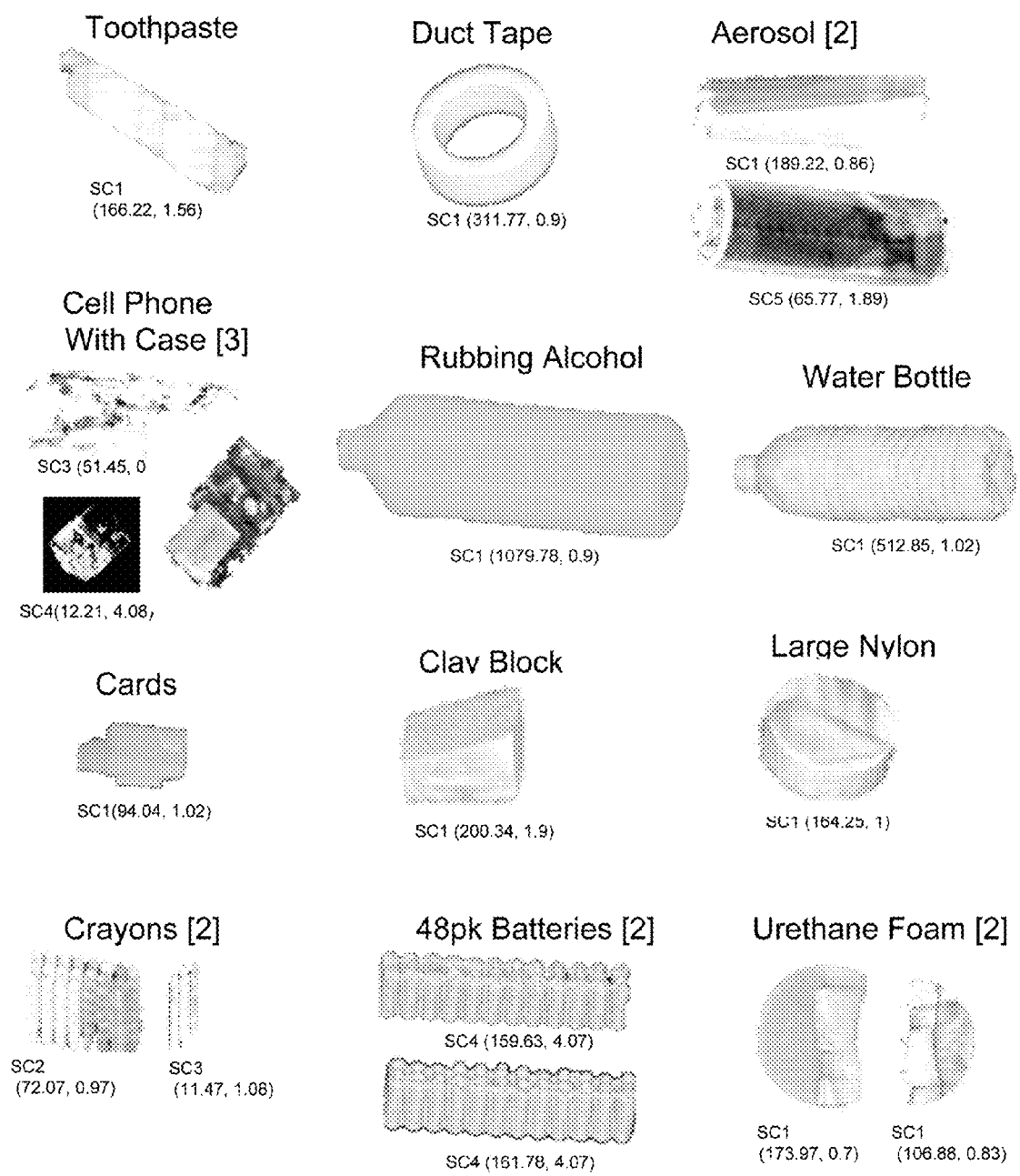
Figure 36:
Figure 41:
Figure 42:
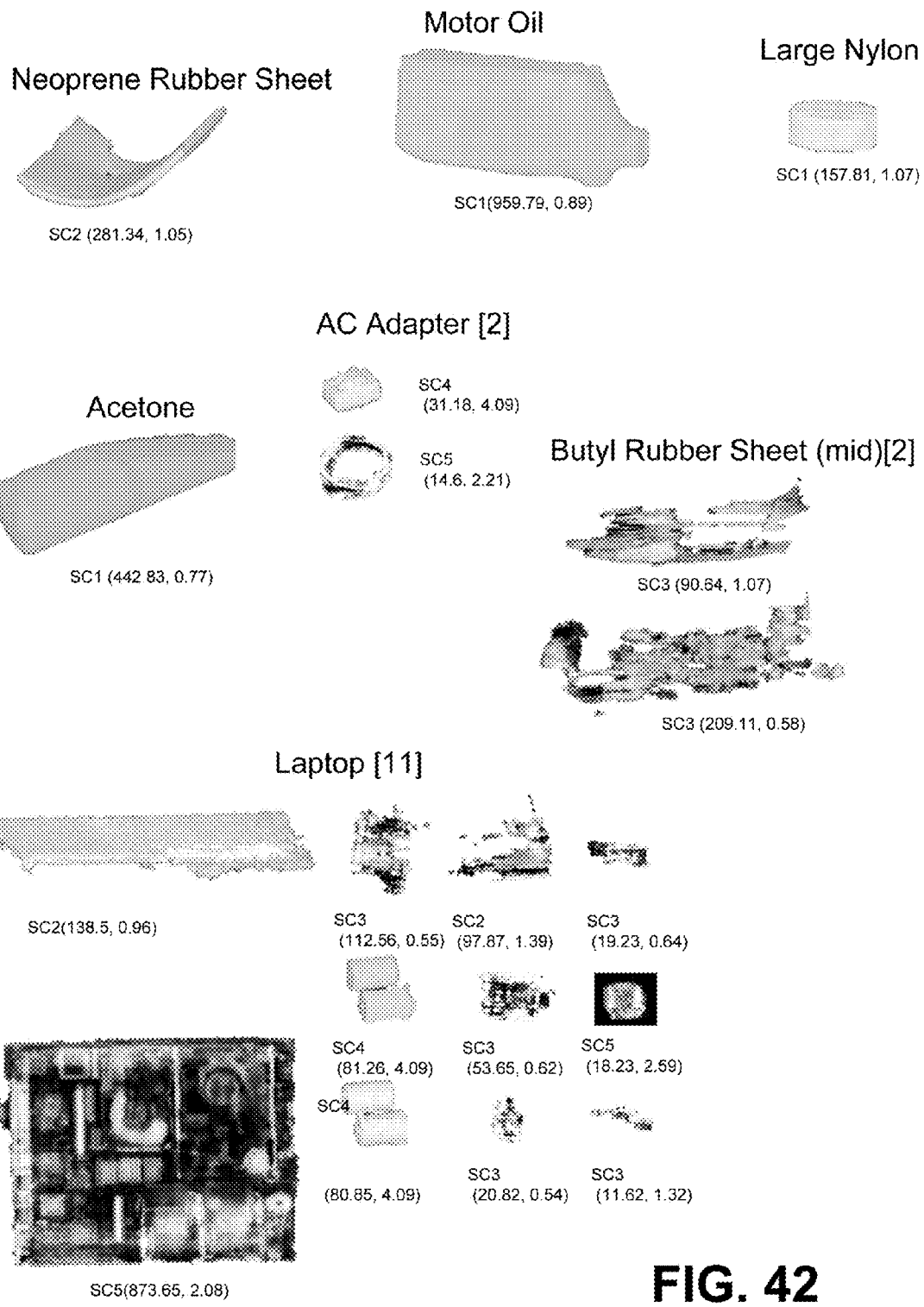
Figure 43:
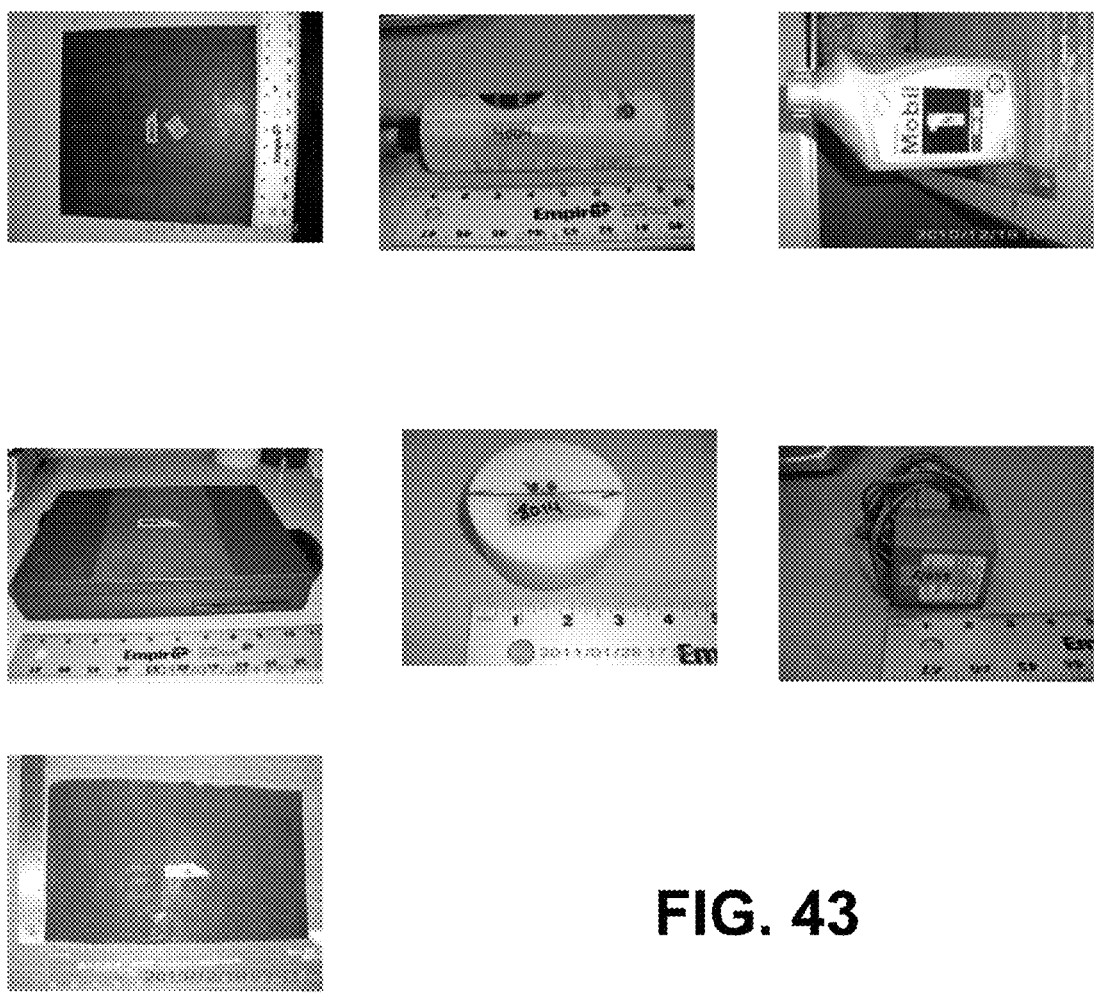
Figure 45:
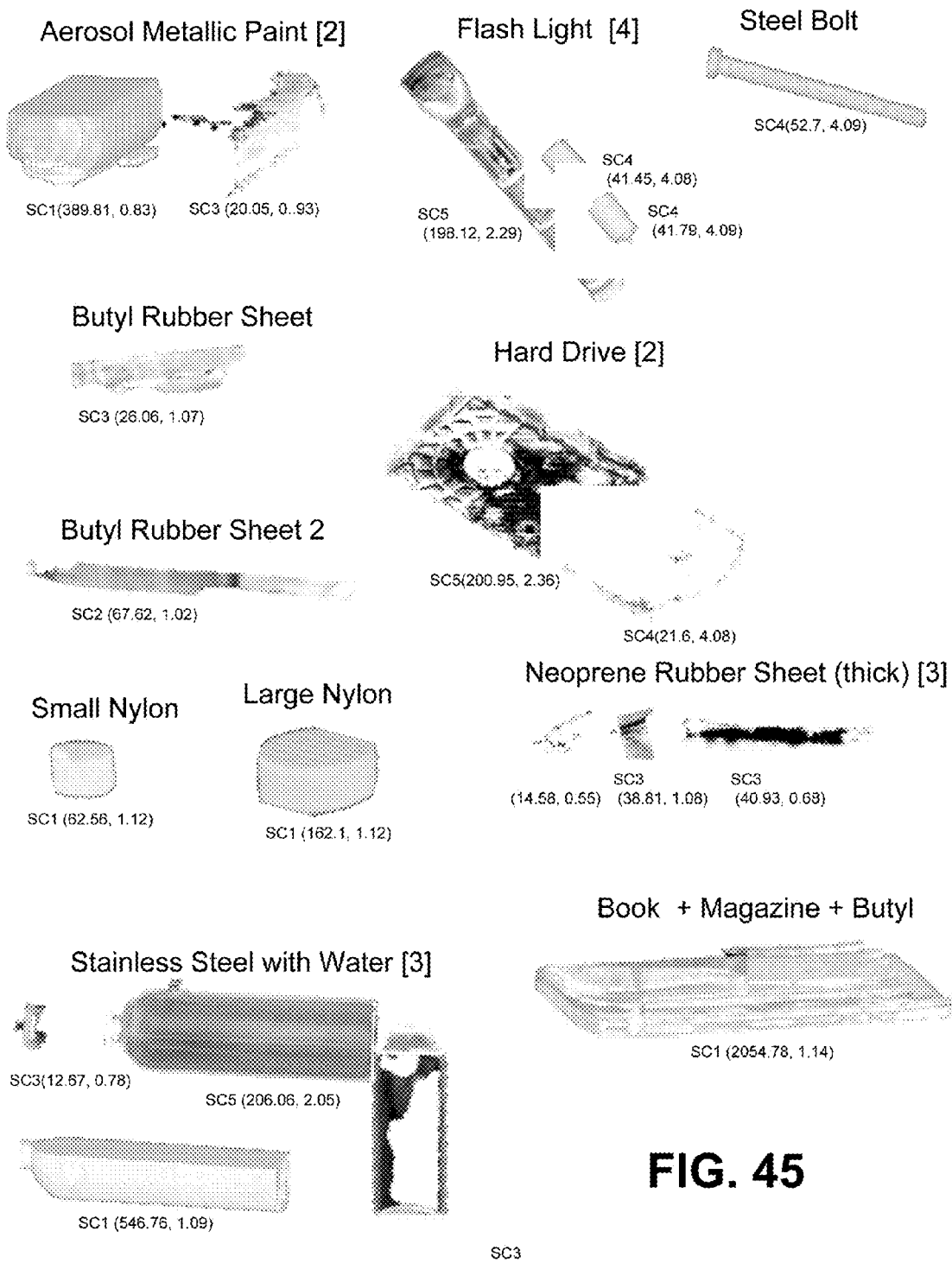
Figure 46:
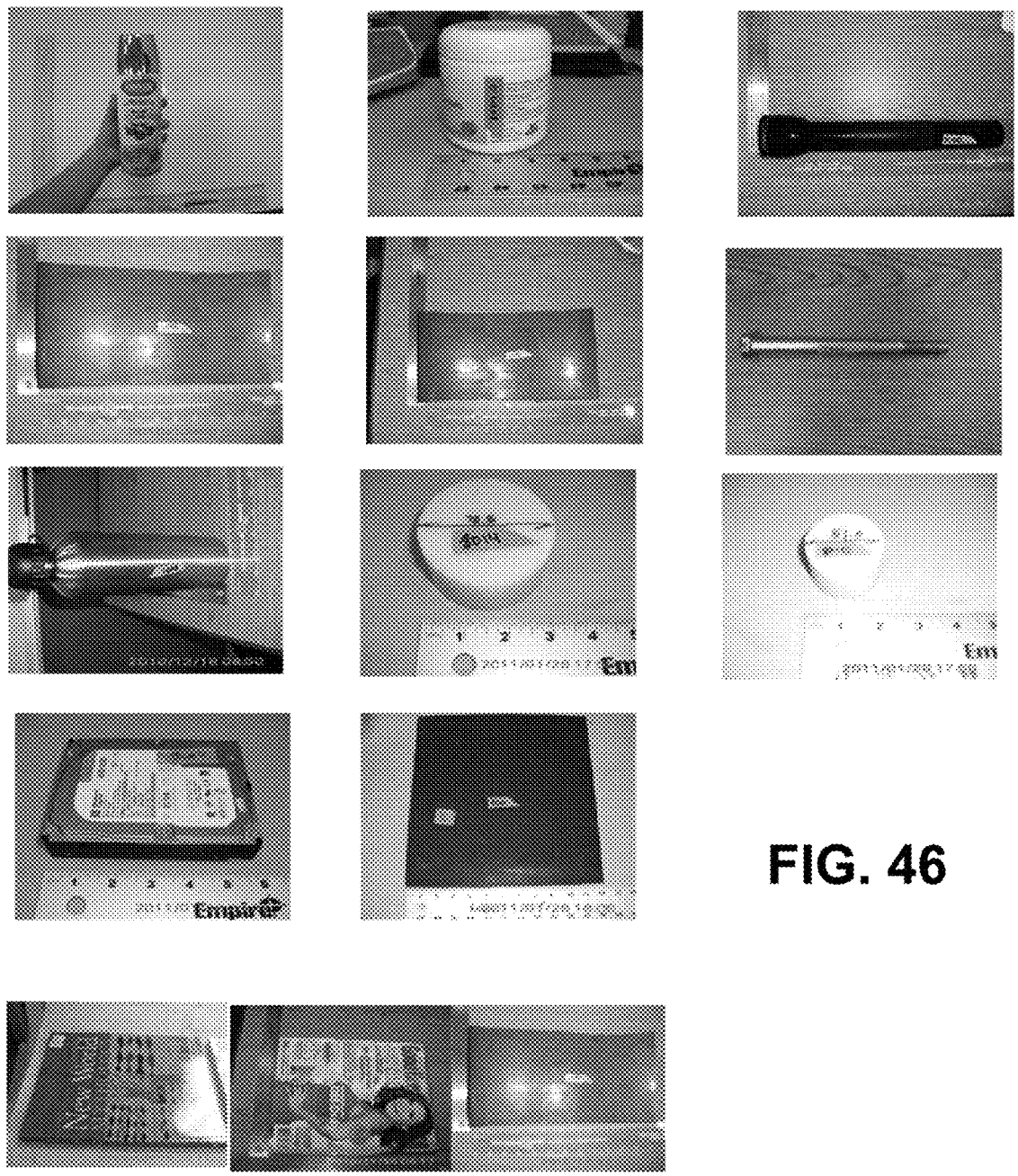

FIGS. 12A and 12B are plots of "Wholeness", "Exclusiveness", "P1Quality", and "P2Quality" computed from our segmentation result for T3.

FIG. 12 shows plots of W, E, $Q_{P_1}$, and $Q_{P_2}$ computed from our segmentation result for T3. From these plots, we can identify that the TSS segmentation algorithm performs quite well for homogeneous objects such as a toothpaste tube, thick hard rubber sheet, and CDs; and moderately for bar soaps, candles, magazine, and Skip Bo. It is also clear that it is difficult to accurately segment objects composed of thin materials such as sneakers and heterogeneous objects such as a flat iron.

Note that this quantitative performance analysis using W, E, $Q_{P_1}$, and $Q_{P_2}$ directly depends on the reference labels, for instance, those provided by ALERT. For example, the reference label for soap bars includes three soap bars and a paper container, and the reference label for Skip Bo includes three card stacks and a metallic container. If there were six independent reference labels for the three soap bars and the three card stacks, our segmentation result would have shown higher segmentation quality figures $Q_{P_1}$, and $Q_{P_2}$.

FIGS. 13A to 13C show three 1-D PSFs estimated from CT data. (a) h(x). (b) k(y). (c) h(z).

FIGS. 14A to 14C show 3-D PSF at z=7, z=8, and z=9, respectively.

FIGS. 15A and 15B show result of deblurring using the 3-D PSF shown in FIG. 14. The display window is [0 1500]. 15A shows the original image, and 15B shows after deblurring.

(f) Discussion and Conclusion (i) Feature Extraction

By assuming that 1000 MHU corresponds to 1 g/cc, object features such as mass, density, and volume can be obtained directly from CT values (unless pixels are corrupted by beam hardening, scatter, streaks, and partial volume effect). In extracting the object features, we should consider the partial volume effect. For bulk and medium thickness objects, better estimates of the densities can be calculated considering only voxels well within the boundary. However, for thin sheet objects, it is not possible to obtain accurate densities due to the partial volume effect affecting every voxel. However, it can be mitigated through deblurring by deconvolution.

We first estimate the three 1-D point spread functions (PSF) of length 17 pixels in the three axes from the CT image. FIG. 13 shows the estimated PSFs. Assuming that the 3-D PSF to be separable, we obtain a 17×17×17 3-D PSF from the estimated 1-D PSFs. FIG. 14 shows certain slices of the 3-D PSF. Using this 3-D PSF, we deblur CT data using Wiener filtering. FIG. 15 shows the result of deblurring for a thin neoprene sheet in T15. The density of a thin neoprene sheet estimated with the original CT images is 0.662, while the density estimated with deblurred images is 0.811. Since the neoprene sheet is considerably thin, a profile of MHU values of its blurred images along the surface normal will have a peaked shape. Based on this exercise, we estimate the density after applying maximum filtering to the deblurred image. In this case, the estimated density is 1.05. Considering that the physical density of neoprene sheets ranges between 1.2 and 1.7 [10], density of the segmented neoprene sheet is estimated more accurately by deblurring.

FIG. 16 to FIG. 46 relate to write-up in the appendix.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A non-transitory computer readable medium containing instructions that when executed by a processor perform a method of extracting objects from a computed tomography (CT) image, the method comprising:
   applying bilateral filtering to a volumetric data of the objects in the CT image;
   sequentially segmenting and carving the objects from the volumetric data of the objects in the CT image,
   wherein the objects are segmented and carved in the order of:
      (1) homogeneous bulk objects, (2) homogeneous medium thickness objects, (3) homogeneous sheet objects, (4) homogeneous metallic objects, and (5) heterogeneous objects;
   adjusting object boundaries of the objects by level set-based active contours which include finding a contour represented by a level set function having an internal term related to contour smoothness and an external term related to image information; and
   splitting and merging the segmented objects based on homogeneity of the objects in the CT image.

2. The non-transitory computer readable medium of claim 1, wherein sequentially segmenting and carving homogeneous bulk objects and homogeneous medium thickness objects each include steps in the order of:
   obtaining a binary mask using a thresholding window;
   performing morphological opening of the binary mask with a structuring element;
   performing symmetric region growing with a region growing parameter for voxels selected by the binary mask; and
   carving the segmented objects out of the volumetric data.

3. The non-transitory computer readable medium of claim 2, the method further comprising adjusting the width of the thresholding window and the size of the structuring element to specify characteristics of target objects for the segmentation and carving.

4. The non-transitory computer readable medium of claim 1, the method further comprising:
   determining whether the segmented objects that have been merged should be split by analyzing a histogram of the segmented objects; and
   splitting merged objects when there are multiple dominant peaks in the histogram.

* * * * *